United States Patent
Oh et al.

(10) Patent No.: US 10,516,915 B2
(45) Date of Patent: *Dec. 24, 2019

(54) APPARATUS AND METHOD OF PROCESSING METADATA FOR INDICATING A CHANGE IN HDR INFORMATION

(71) Applicant: LG ELECTRONICS INC., Seoul (KR)

(72) Inventors: Hyunmook Oh, Seoul (KR); Jongyeul Suh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/554,145

(22) PCT Filed: Apr. 22, 2016

(86) PCT No.: PCT/KR2016/004225
§ 371 (c)(1),
(2) Date: Aug. 28, 2017

(87) PCT Pub. No.: WO2016/171510
PCT Pub. Date: Oct. 27, 2016

(65) Prior Publication Data
US 2018/0077453 A1 Mar. 15, 2018

Related U.S. Application Data

(60) Provisional application No. 62/160,611, filed on May 13, 2015, provisional application No. 62/152,045, filed on Apr. 24, 2015.

(51) Int. Cl.
*H04N 7/173* (2011.01)
*H04N 21/4402* (2011.01)
(Continued)

(52) U.S. Cl.
CPC ...... *H04N 21/44029* (2013.01); *H04H 20/30* (2013.01); *H04H 60/73* (2013.01);
(Continued)

(58) Field of Classification Search
CPC ......... H04N 21/23614; H04N 21/4348; H04N 21/44029
See application file for complete search history.

(56) References Cited

U.S. PATENT DOCUMENTS 9,973,779 B2 * 5/2018 Konstantinides .... H04N 19/597
2015/0156469 A1 * 6/2015 Qu ....................... H04N 9/8715
348/43

(Continued)

FOREIGN PATENT DOCUMENTS

KR 10-2013-0036730 A 4/2013
KR 10-2014-0120320 A 10/2014
(Continued)

*Primary Examiner* — Gigi L Dubasky
(74) *Attorney, Agent, or Firm* — Birch, Stewart, Kolasch & Birch, LLP

(57) ABSTRACT

The present invention relates to a device and a method for transmitting/receiving a broadcast signal including video data and high dynamic range information. A broadcast signal transmitting method according to an embodiment of the present invention may include the steps of: generating video data; generating a broadcast signal including the generated video data and image quality improving metadata; and transmitting the generated broadcast signal.

5 Claims, 20 Drawing Sheets

(51) Int. Cl.
- *H04N 9/69* (2006.01)
- *H04H 20/30* (2008.01)
- *H04N 21/235* (2011.01)
- *H04N 21/236* (2011.01)
- *H04N 21/434* (2011.01)
- *H04H 60/73* (2008.01)
- *H04N 21/2362* (2011.01)
- *H04N 21/81* (2011.01)
- *H04N 19/70* (2014.01)
- *H04N 19/30* (2014.01)

(52) U.S. Cl.
CPC .............. *H04N 9/69* (2013.01); *H04N 19/70* (2014.11); *H04N 21/2353* (2013.01); *H04N 21/2362* (2013.01); *H04N 21/23614* (2013.01); *H04N 21/4345* (2013.01); *H04N 21/4348* (2013.01); *H04N 21/816* (2013.01); *H04N 19/30* (2014.11)

(56) References Cited

U.S. PATENT DOCUMENTS

| | | | |
|---|---|---|---|
| 2015/0237322 A1* | 8/2015 | Stec | H04N 9/77 348/453 |
| 2015/0256846 A1* | 9/2015 | Hattori | H04N 19/46 375/240.16 |
| 2015/0326896 A1* | 11/2015 | Su | H04N 19/46 375/240.26 |
| 2016/0105695 A1* | 4/2016 | Qu | H04N 21/2353 348/708 |
| 2017/0105042 A1* | 4/2017 | Toma | H04N 5/765 |

FOREIGN PATENT DOCUMENTS

| KR | 10-2015-0002440 A | 1/2015 |
|---|---|---|
| KR | 10-2015-0029606 A | 3/2015 |
| KR | 10-2015-0040110 A | 4/2015 |

\* cited by examiner

FIG. 4

| sei_payload ( payloadType , payloadSize ) { | Category | Descriptor |
|---|---|---|
| ... | | |
| if( payloadType == 52 ) | | |
| HDR_info(payloadSize ) | 5 | |

| HDR_info(payloadSize) { | No. of bits | Descriptor |
|---|---|---|
| HDR_info_type | 4 | uimsbf |
| transition_flag | 1 | uimsbf |
| reserved | 3 | uimsbf |
| set_number | 8 | uimsbf |
| version_number | 8 | uimsbf |
| dynamic_range_mapping_info_present_flag | 1 | uimsbf |
| color_gamut_mapping_info_present_flag | 1 | uimsbf |
| viewing_condition_info_present_flag | 1 | uimsbf |
| reserved | 5 | uimsbf |
| number_of_HDR_video_enhancement_info | 4 | uimsbf |
| for(i=0; i<number_of_HDR_video_enhancement_info; i++) { | | |
| HDR_video_enhancement_info_present_type[i] | 4 | uimsbf |
| enh_dynamic_range_mapping_info_present_flag[i] | 1 | uimsbf |
| enh_color_gamut_mapping_info_present_flag[i] | 1 | uimsbf |
| enh_viewing_condition_info_present_flag[i] | 1 | uimsbf |
| reserved | 1 | uimsbf |
| } | | |
| sync_info_type | 8 | uimsbf |
| sync_start | 16 | uimsbf |
| sync_duration | 16 | uimsbf |
| number_of_dynamic_range_info | 8 | uimsbf |
| for(i=0; i<number_of_dynamic_range_info; i++) { | | |
| dynamic_range_info_type | 8 | uimsbf |
| dynamic_range_info_value[i] | 8 | uimsbf |
| } | | |
| transfer_function_type | 8 | uimsbf |
| color_gamut_type | 8 | uimsbf |
| color_temperature_type | 8 | uimsbf |
| if(dynamic_range_mapping_info_present_flag == 1) { | | |
| dynamic_range_mapping_info_type | 8 | uimsbf |
| dynamic_range_mapping_info (dynamic_range_mapping_info_type) | | |
| } | | |
| if(color_gamut_mapping_info_present_flag == 1) { | | |
| color_gamut_mapping_info_type | 8 | uimsbf |
| color_gamut_mapping_info(color_gamut_mapping_info_type) | | |
| } | | |
| if(viewing_condition_info_present_flag == 1) { | | |
| viewing_condition_info_type | 8 | uimsbf |
| viewing_condition_info(viewing_condition_info_type) | | |
| } | | |
| } | | |

FIG. 5

| HDR_info_type | Description |
|---|---|
| 0000 | mastering display |
| 0001 | channel |
| 0010 | program |
| 0011 | content |
| 0100 | scene |
| 0101 | clip |
| 0110 | frame |
| 0111 - 1111 | Reserved for future use |

FIG. 6

| sync_info_type | Description |
|---|---|
| 0x00 | time (ms) |
| 0x01 | Time difference (ms) |
| 0x02 | Start order (0,1,2,3...) |
| 0x03 | POC( Picture order count ) |
| 0x04 | PTS |
| 0x05 | accumulated frame based on reference time |
| 0x06 – 0xFF | Reserved |

| dynamic_range_info_type | Description | Example |
|---|---|---|
| 0x00 | Contrast ratio | N for N:1 contrast ratio |
| 0x01 | F-stop | n for $2^n$ f-stop |
| 0x02 | peak_luminance_level | Peak luminance (nit or $cd/m^2$) |
| 0x03 | minimum_luminance_level | minimum luminance (nit or $cd/m^2$) |
| 0x04 | average_level | average luminance (nit or $cd/m^2$) |
| 0x05 | median_level | median luminance (nit or $cd/m^2$) |
| 0x06 | white_level_A | white reference A (e.g. diffuse white) |
| 0x07 | white_level_B | white reference B (e.g. specular white) |
| 0x08 | black_level_A | black reference A (e.g. deep black) |
| 0x09 | black_level_B | black reference B (e.g. pitch dark) |
| 0x0A – 0xFF | Reserved | |

FIG. 7 dynamic_range_mapping_info_type

| type | Description |
|---|---|
| 0x00 | referencing HEVC SEI message A (Knee function information SEI message) |
| 0x01 | referencing HEVC SEI message B (Tone mapping information SEI message) |
| 0x02 | referencing SEI message A (Dynamic_range_transformation_info SEI message) |
| 0x03 | dynamic_range_mapping_info ( ) directly define |
| 0x04 – 0xFF | Reserved | color_gamut_mapping_info_type

| type | Description |
|---|---|
| 0x00 | referencing HEVC SEI message A (Colour remapping information SEI message) |
| 0x01 | referencing SEI message A (Gamut_resampling_info SEI message) |
| 0x02 | referencing SEI message B (enhanced_gamut_mapping_info SEI message) |
| 0x03 | Color_gamut_mapping_info ( ) directly define |
| 0x04 – 0xFF | Reserved |

FIG. 10

| dynamic_range_mapping_info (payloadSize) { | C | Descriptor |
|---|---|---|
| luminance_max | | |
| luminance_min | | |
| private_EOTF | | |
| if(private_EOTF == 1){ | | |
|     number_of_coeff | | |
|     for(i=0; i<number_of_coeff; i++) | | |
|         transfer_curve_coeff[i] | | |
| } | | |
| clipping_flag | | |
| linear_mapping_flag | | |
| if(clipping_flag == 1) { | | |
|     luma_clipping_upper_bound | | |
|     luma_clipping_lower_bound | | |
| } | | |
| luminance_upper_bound | | |
| luminance_lower_bound | | |
| luma_upper_value | | |
| luma_lower_value | | |
| mid_DR_transformation_curve_type | | |
| mid_DR_transformation_curve() | | |
| mid_DR_percentage | | |
| upper_DR_transformation_curve_type | | |
| upper_DR_transformation_curve() | | |
| upper_DR_percentage | | |
| lower_DR_transformation_curve_type | | |
| lower_DR_transformation_curve() | | |
| number_luminance_upper_bound_diff | | |
| for(i=0; number_luminance_upper_bound_diff; i++) { | | |
|     luminance_upper_bound_diff[i] | | |
|     luma_upper_value_diff[i] | | |
|     upper_DR_transformation_curve_type[i] | | |
|     upper_DR_transformation_curve() | | |
|     upper_DR_percentage[i] | | |
|     mid_DR_percentage[i] | | |
| } | | |

FIG. 11

| colour_remapping_info( payloadSize ) { | Descriptor |
|---|---|
| colour_remap_id | ue(v) |
| colour_remap_cancel_flag | u(1) |
| if( !colour_remap_cancel_flag ) { | |
|   colour_remap_persistence_flag | u(1) |
|   colour_remap_video_signal_info_present_flag | u(1) |
|   if( colour_remap_video_signal_info_present_flag ) { | |
|     colour_remap_full_range_flag | u(1) |
|     colour_remap_primaries | u(8) |
|     colour_remap_transfer_function | u(8) |
|     colour_remap_matrix_coefficients | u(8) |
|   } | |
|   colour_remap_input_bit_depth | u(8) |
|   colour_remap_bit_depth | u(8) |
|   for( c = 0; c < 3; c++ ) { | |
|     pre_lut_num_val_minus1 [c] | u(8) |
|     if( pre_lut_num_val_minus1 [c] > 0 ) | |
|       for( i = 0; i <= pre_lut_num_val_minus1 [c]; i++ ) { | |
|         pre_lut_coded_value [c][i] | u(v) |
|         pre_lut_target_value [c][i] | u(v) |
|       } | |
|   } | |
|   colour_remap_matrix_present_flag | u(1) |
|   if( colour_remap_matrix_present_flag ) { | |
|     log2_matrix_denom | u(4) |
|     for( c = 0; c < 3; c++ ) | |
|       for( i = 0; i < 3; i++ ) | |
|         colour_remap_coeffs [c][i] | se(v) |
|   } | |
|   for( c = 0; c < 3; c++ ) { | |
|     post_lut_num_val_minus1 [c] | u(8) |
|     if( post_lut_num_val_minus1 [c] > 0 ) | |
|       for( i = 0; i <= post_lut_num_val_minus1 [c]; i++ ) { | |
|         post_lut_coded_value [c][i] | u(v) |
|         post_lut_target_value [c][i] | u(v) |
|       } | |
|   } | |
| } | |
| } | |

FIG. 12

| Syntax | No. of bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for( i = 0; i < N; i++ ) { | | |
|         descriptor () | | |
|     } | | |
|     for( i = 0; i < N1; i++ ) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for( i = 0; i < N2; i++ ) { | | |
|             descriptor () | | |
|         } | | |
|     } | | |
|     CRC_32 | 32 | rpchof |
| } | | |

FIG. 13

| Syntax | No. of bits | Format |
|---|---|---|
| UHD_program_info_descriptor ( ) { | | |
| descriptor_tag | 8 | uimsbf |
| descriptor_length | 8 | uimsbf |
| UHD_service_type | 4 | uimsbf |
| Reserved | 4 | |
| } | | |

| UHD_service_type | example |
|---|---|
| 0000 | UHD1 |
| 0001 | UHD2 |
| 0010-0111 | Reserved |
| 1000-1111 | User private |

FIG. 14

| Syntax | Number of bits | Mnemonic |
|---|---|---|
| event_information_table_section(){ | | |
|     table_id | 8 | 0xCB |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for( j = 0; j < num_events_in_section; j++ ) { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text() | Var | |
|         reserved | 4 | '1111' |
|         descriptors_length | 12 | |
|         for( i = 0; i < N; i++ ) { | | |
|             descriptor() | | |
|         } | | |
|     } | | |
|     CRC_32 | 32 | rpchof |
| } | | |

FIG. 15

| Syntax | Number of bits | Identifier |
|---|---|---|
| event_information_section(){ | | |
|    table_id | 8 | uimsbf |
|    section_syntax_indicator | 1 | bslbf |
|    reserved_future_use | 1 | bslbf |
|    reserved | 2 | bslbf |
|    section_length | 12 | uimsbf |
|    service_id | 16 | uimsbf |
|    reserved | 2 | bslbf |
|    version_number | 5 | uimsbf |
|    current_next_indicator | 1 | bslbf |
|    section_number | 8 | uimsbf |
|    last_section_number | 8 | uimsbf |
|    transport_stream_id | 16 | uimsbf |
|    original_network_id | 16 | uimsbf |
|    segment_last_section_number | 8 | uimsbf |
|    last_table_id | 8 | uimsbf |
|    for( i = 0; i < N; i++ ) { | | |
|       event_id | 16 | uimsbf |
|       start_time | 40 | bslbf |
|       duration | 24 | uimsbf |
|       running_status | 3 | uimsbf |
|       free_CA_mode | 1 | bslbf |
|       descriptors_loop_length | 12 | uimsbf |
|       for( i = 0; i < N; i++ ) { | | |
|          descriptor() | | |
|       } | | |
|    } | | |
|    CRC_32 | 32 | rpchof |
| } | | |

FIG. 16

| Syntax | No. of bits | Format |
|---|---|---|
| HDR_info_descriptor( ) { | | |
|     descriptor_tag | 8 | uimsbf |
|     descriptor_length | 8 | uimsbf |
|     reserved | 4 | |
|     number_of_info | 4 | |
|     for( i = 0; i < number_of_info; i++) { | | |
|         HDR_info_metadata ( ) | | |
|     } | | |
| } | | |

FIG. 18

| HDR_info(payloadSize) { | No. of bits | Descriptor |
|---|---|---|
| ... | | |
| input_color_space_type | 4 | uimsbf |
| input_color_precision | 4 | |
| output_color_space_type | 4 | uimsbf |
| output_color_precision | 4 | |
| processing_color_space_type | 4 | uimsbf |
| processing_color_precision | 4 | |
| number_of_target_dynamic_range_info_type | 8 | uimsbf |
| for(i=0; i<number_of_target_dynamic_range_info_type; i++) { | | |
|     target_dynamic_range_info_type | 8 | uimsbf |
|     target_dynamic_range_info_value[i] | 8 | uimsbf |
| } | | |
| target_transfer_function_type | 8 | uimsbf |
| target_color_gamut_type | 8 | uimsbf |
| target_color_temperature_type | 8 | uimsbf |
| } | | |

FIG. 19

| HDR_info(payloadSize) { | No. of bits | Descriptor |
|---|---|---|
| ... | | |
| HDR_program_transition_flag | 1 | uimsbf |
| if(HDR_program_transition_flag == 1) { | | |
|     transition_set_number | 4 | uimsbf |
|     transition_version_number | 4 | uimsbf |
| } | | |
| } | | |

APPARATUS AND METHOD OF PROCESSING METADATA FOR INDICATING A CHANGE IN HDR INFORMATION

CROSS REFERENCE TO RELATED APPLICATIONS

This application is the National Phase of PCT International Application No. PCT/KR2016/004225, filed on Apr. 22, 2016, which claims priority under 35 U.S.C. 119(e) to U.S. Provisional Application No. 62/152,045, filed on Apr. 24, 2015 and No. 62/160,611, filed on May 13, 2015, all of which are hereby expressly incorporated by reference into the present application.

TECHNICAL FIELD

The present invention relates to a device and method for transmitting/receiving a broadcast signal.

BACKGROUND ART

With the development of digital technology and communication technology, a demand for and propagation of audio/video based multimedia content are rapidly increasing in various areas such as Internet and personal media as well as broadcast and movies. Furthermore, a consumer demand for immersive media which provide sense of reality through broadcast and movies is increasing. In addition, as home TV screens become large with the development of display technology, demand for realistic content with more than high definition (HD) is increasing. Realistic broadcasting such as UHDTV (Ultra High Definition TV) along with 3DTV attracts attention as a future broadcast service. Particularly, a discussion about UHD broadcast services is increasingly conducted.

DISCLOSURE

Technical Problem

An object of the present invention is to improve transmission efficiency in a method and device for transmitting a broadcast signal.

Another object of the present invention is to provide a transmission device and method for transmitting metadata for dynamically providing brightness representation and color representation of content.

Technical Solution

A method of transmitting a broadcast signal according to an embodiment of the present invention includes: generating video data; generating a broadcast signal including the generated video data and video quality enhancement metadata; and transmitting the generated broadcast signal.

In the method of transmitting a broadcast signal according to an embodiment of the present invention, the video quality enhancement metadata may include high dynamic range (HDR) information or wide color gamut (WCG) information.

In the method of transmitting a broadcast signal according to an embodiment of the present invention, the WCG information may include input color space type information applied before video quality enhancement processing, processing color space type information applied to the video quality enhancement processing, and output color space type information applied after the video quality enhancement processing.

In the method of transmitting a broadcast signal according to an embodiment of the present invention, the HDR information may include HDR information applied to video quality enhancement processing and HDR information about video quality which is targeted after the video quality enhancement processing.

In the method of transmitting a broadcast signal according to an embodiment of the present invention, the video quality enhancement metadata may further include information indicating a change in HDR information.

In the method of transmitting a broadcast signal according to an embodiment of the present invention, the video quality enhancement metadata may further include set number information and version number information related to the changed HDR information.

A method of receiving a broadcast signal according to an embodiment of the present invention includes: receiving a broadcast signal including video data and video quality enhancement metadata; demultiplexing the broadcast signal into the video data and the video quality enhancement metadata; decoding the video data and the video quality enhancement metadata; and applying the video quality enhancement metadata to the video data.

In the method of receiving a broadcast signal according to an embodiment of the present invention, the video quality enhancement metadata may include high dynamic range (HDR) information or wide color gamut (WCG) information.

In the method of receiving a broadcast signal according to an embodiment of the present invention, the WCG information may include input color space type information applied before video quality enhancement processing, processing color space type information applied to the video quality enhancement processing, and output color space type information applied after the video quality enhancement processing.

In the method of receiving a broadcast signal according to an embodiment of the present invention, the HDR information may include HDR information applied to video quality enhancement processing and HDR information about video quality which is targeted after the video quality enhancement processing.

In the method of receiving a broadcast signal according to an embodiment of the present invention, the video quality enhancement metadata may further include information indicating a change in HDR information.

In the method of receiving a broadcast signal according to an embodiment of the present invention, the video quality enhancement metadata may further include set number information and version number information related to the changed HDR information.

Advantageous Effects

According to embodiments of the present invention, it is possible to improve transmission efficiency of a broadcast system.

According to embodiments of the present invention, a broadcast network can provide dynamic luminance representation and color representation for each piece of content.

According to embodiments of the present invention, a broadcast network can provide dynamic luminance representation and color representation per scene in content.

DESCRIPTION OF DRAWINGS

FIGS. 4 to 7 illustrate syntaxes of an SEI message and an HDR information descriptor according to an embodiment of the present invention.

FIG. 10 illustrates dynamic_range_mapping_info according to an embodiment of the present invention.

FIG. 11 illustrates a case in which an SEI message defined in HEVC is referred to according to an embodiment of the present invention.

FIGS. 12 and 13 illustrate an embodiment of signaling an HDR_info descriptor according to an embodiment of the present invention through a PMT.

FIGS. 14 and 15 illustrate an embodiment of signaling the HDR_info descriptor according to the embodiment of the present invention through an EIT.

FIG. 16 illustrates HDR_info_descriptor( ) according to another embodiment of the present invention.

FIG. 18 illustrates an HDR information descriptor according to an embodiment of the present invention.

FIG. 19 illustrates an HDR information descriptor according to an embodiment of the present invention.

BEST MODE

The present invention can provide a method for converting and presenting content as images with enhanced video quality by transmitting, to a receiver, a factor which can adaptively adjust the content for characteristics of various scenes included in the content when high dynamic range (HDR) content which can be represented in a wide range of luminance is provided. UHD broadcast can be discriminated from conventional broadcast and can provide high level of presence by representing luminance which cannot be expressed in conventional content. As a dynamic range of images increases according to introduction of HDR (high dynamic range), a characteristic difference between scenes included in content may increase. Accordingly, a broadcast transmission device can additionally provide information for effectively displaying characteristics of each scene on a display and a reception device can present images through a method suitable for a producer's intention by providing video effects on the basis of the transmitted information.

UHD broadcast can provide enhanced video quality and immersiveness to viewers through various methods compared to HD broadcast. As one of the methods, UHD broadcast can provide a method of extending ranges of representation of luminance and color expressed in content to luminance and color recognition ranges which can be recognized by the human visual system. That is, HDR (high dynamic range) and WCG (wide color gamut) can be applied to UHD content. That is, content with enhanced contrast and colors is provided such that a UHD content user can experience improved immersiveness and presence. The present invention provides a method for effectively presenting luminance and color of images of content depending on intention of a producer when the content is presented through a display such that a user can view images with enhanced video quality.

Figure 1:
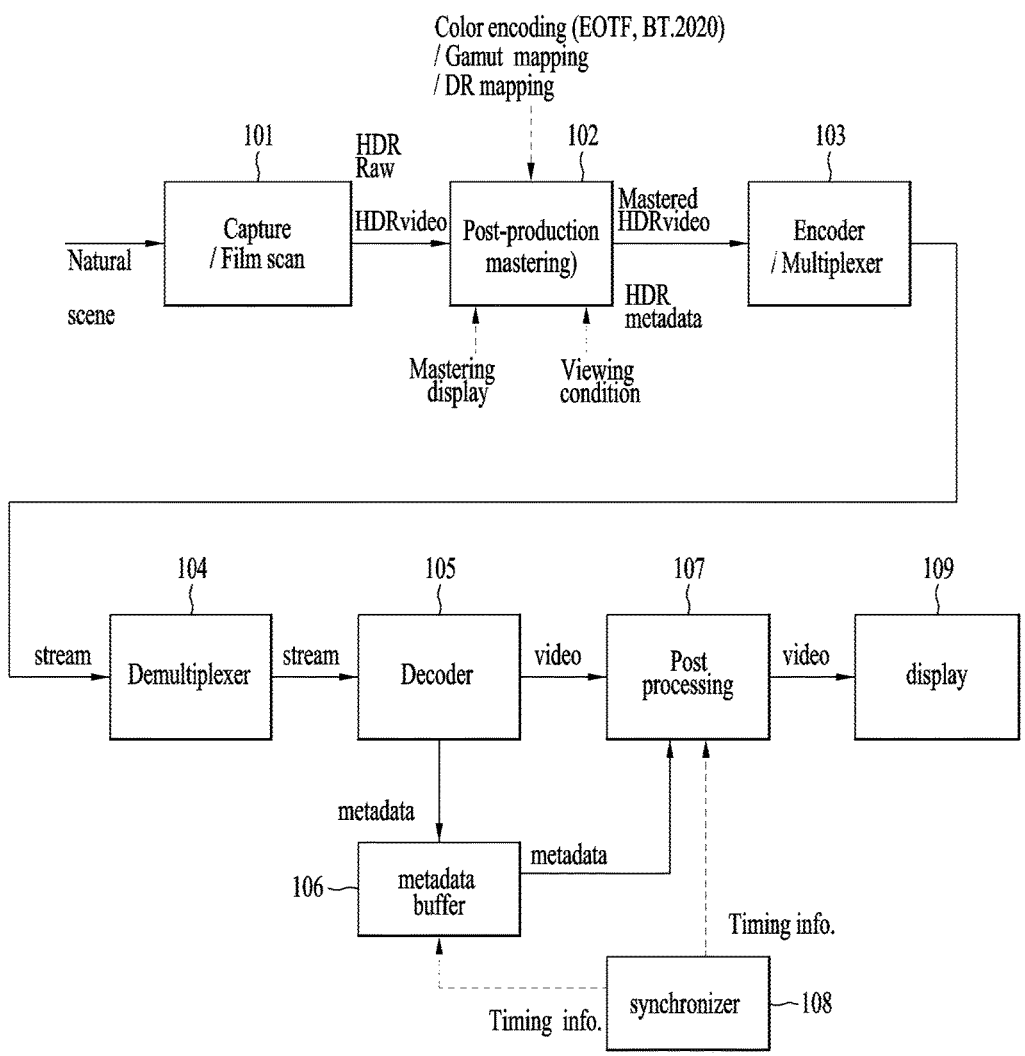
FIG. 1 illustrates a device that produces and reproduces a metadata based HDR broadcast service according to an embodiment of the present invention.

FIG. 1 illustrates a device that produces and reproduces a metadata based HDR broadcast service according to an embodiment of the present invention. An HDR video production device may include at least one of a capture/film scanner 101, a post-production block (mastering unit) 102 and an encoder/multiplexer 103. An HDR video reproduction device may include at least one of a demultiplexer 104, a decoder 105, a metadata processor 106, a post processor 107, a synchronizer 108 and a display 109. While the figure shows metadata received by being included in a video stream, metadata of the present invention may be transmitted and received through other routes (e.g., IP based broadcast/communication, wired/wireless communication, wired/wireless interfaces, short-range wireless communication, etc.) in addition to broadcast signals.

The capture/film scanner 101 of the HDR video production device may convert a natural scene into digital video. For example, the capture/film scanner may be a device that converts optical images obtained by a video camera, a camera, a scanner and the like into digital images. The capture/film scanner 101 may sense an optical image and output raw HDR (High Dynamic Range) video.

The post-production block (mastering unit) 102 may receive the raw HDR video and output mastered HDR video and HDR metadata. The post-production block may receive mastering display information, viewing condition information, color encoding information, gamut mapping information and/or DR (Dynamic Range) information and perform mastering. Here, the color encoding information can be an EOTF (electro-optical transfer function) such as BT.2020, for example.

The encoder/multiplexer 103 may encode and multiplex at least one piece of mastered HDR video and HDR metadata.

The demultiplexer 104 of the HDR video reproduction device may receive and demultiplex an HDR stream. A single HDR stream may include a plurality of pieces of content. The demultiplexer may output the HDR stream corresponding to a decoding target to the decoder.

The decoder 105 may receive and decode the HDR stream. In this process, the decoder may output decoded HDR video and HDR metadata. The decoded HDR video may be output to the post processor and the HDR metadata may be output to the metadata processor.

The metadata processor 106 may receive and store the HDR metadata. The metadata processor may check whether the stored HDR metadata has been changed by checking a set number or a version number included in the HDR metadata and update existing HDR metadata when the stored HDR metadata has been changed. The metadata processor may output the HDR metadata to the post processor according to timing information received from the synchronizer.

The post processor 107 may perform post-processing on the HDR video received from the decoder using the HDR metadata received from the metadata processor. Through this process, the HDR video can be converted to enhanced HDR video in which the HDR metadata has been reflected.

The synchronizer 108 may provide timing information to the metadata processor and the post processor such that metadata is applied to the whole HDR video or each scene thereof, each video clip or each frame at correct timing. Here, metadata may represent information about mastering display or may refer to information commonly applied for a channel, a program and content or information applied to continuous scenes, video clips and frames.

The HDR display 109 may display and provide the enhanced HDR video to a user.

Figure 2:
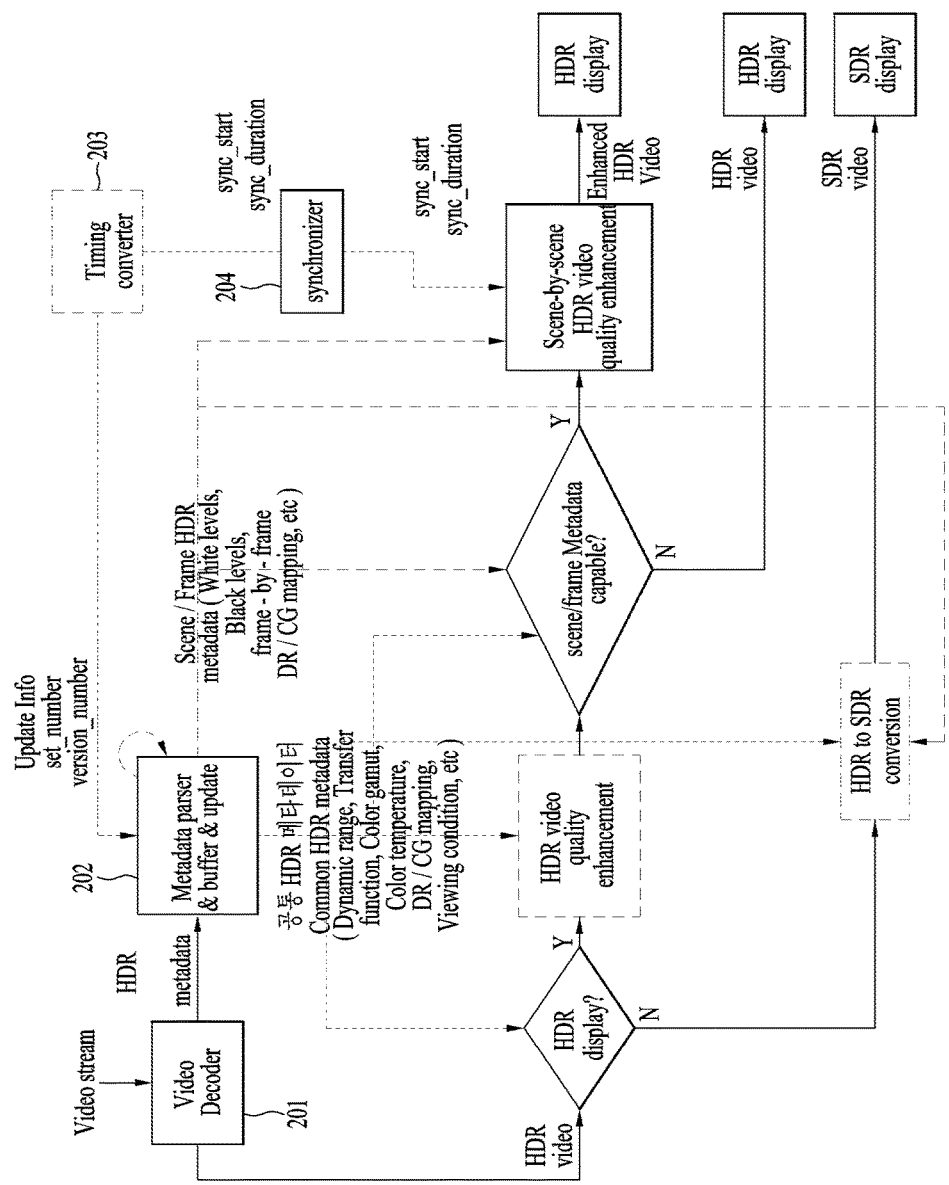
FIG. 2 illustrates an operation method of a receiver for HDR video according to an embodiment of the present invention.

FIG. 2 illustrates an operation method of a receiver for HDR video according to an embodiment of the present invention. Although receiver operation is mainly described in the present invention, the same details can be considered when related signals are generated and can be applied to delivery signals between productions and a mastering signal.

When a video stream is received, the receiver may separate HDR metadata from an HDR video signal using a video decoder 201 and store the separated HDR metadata in a separate metadata parser 202. The metadata processor may include a metadata parser, a metadata buffer and a metadata update unit. The HDR metadata may include common HDR metadata and scene/frame HDR metadata. The common HDR metadata is applicable to entire content and may refer to information commonly applied in units of channel, program and content.

The scene/frame HDR metadata may be metadata limitedly applicable to part of content and may refer to information applied to continuous scenes, video clips or frames. The receiver may determine the performance for reproducible content type and then apply received common HDR metadata or scene/frame HDR metadata to content and process the content. A receiver capable of reproducing HDR video may convert content using received metadata. The receiver may display the converted content as a final image after the processing operation. A detailed receiver operation method will be described below.

In the first step, the receiver may decode a video stream and acquire HDR metadata. The HDR metadata may refer to HDR video information (referred to as HDR_info( ) hereinafter). The receiver may deliver the metadata acquired from the video stream to the metadata parser 202, analyze the metadata and store the metadata in a memory. The metadata can be divided into common HDR metadata and scene/frame HDR metadata. In the present invention, it is possible to apply the metadata according to mastering display, to commonly apply the metadata to a channel, a program and content or to apply the metadata to continuous scenes, video clips and frames by delivering a range within which the metadata is applied using type information HDR_info_type which will be described below.

In addition, the metadata may further include a period to which the metadata is applied, for example, information for matching the metadata with an applied video frame in the format of synchronization start information sync_start and synchronization duration information sync_duration.

According to an embodiment, the common HDR metadata may include at least one of a value indicating the dynamic range of content/mastering display/frame, such as maximum/minimum luminance or high contrast, a transfer function such as EOTF, the color gamut of the content or mastering display, the color temperature of the content or mastering display, a dynamic range transfer function, a color gamut transfer function and viewing condition information.

In the specification, the value indicating the dynamic range of the content/mastering display/frame may be transmitted using dynamic_range_info_type and dynamic_range_info_value[i]. The transfer function such as EOTF may be transmitted using transfer_function_type. The color gamut of the content or mastering display may be transmitted using color_gamut_type. The color temperature of the content or mastering display may be transmitted using color_temperature_type. The dynamic range transfer function may be transmitted using dynamic_range_mapping_info_type. The color gamut transfer function may be transmitting using color_gamut_mapping_info_type. The viewing condition information may be transmitted using viewing_condition_info_type. The syntax of information and fields included therein will be described below.

The scene/frame HDR metadata may include information identical or similar to the common HDR metadata and may also include information about a range to which the scene/frame HDR metadata is applied. The scene/frame HDR metadata can deliver more specific information because the range to which the scene/frame HDR metadata is applied is limited to some parts of content. For example, the common HDR metadata can deliver a dynamic range applied to entire content as a value such as f-stop or high contrast, whereas the scene/frame HDR metadata can deliver maximum and minimum values for a frame unit to achieve delivery of more specific information. Accordingly, different information delivery ranges can be applied to steps according to types of delivered metadata. Similarly, in the case of dynamic range mapping, information regarding transformation of overall content may be delivered as the common HDR metadata and then a complicated transfer function capable of representing characteristics of each scene may be delivered through the scene/frame HDR metadata.

In the second step, the receiver may determine whether the display included therein is an HDR display. The receiver may determine whether a presentation condition of the receiver is suitable on the basis of information about the acquired content (or information about mastering display) using common information. For example, the receiver may use the aforementioned common HDR metadata and may consider an SDR display or a display having performance between SDR and HDR if the content presentation condition is not suitable.

A case in which the display included in the receiver is an SDR display or a display having performance equivalent thereto will be described first. Upon determining that the receiver display cannot completely present decoded HDR content, the receiver may not present the HDR content or may perform conversion for content presentation. A receiver that can convert HDR video into SDR video can convert received HDR video into SDR video and present the SDR video. To this end, HDR metadata may include information about a transfer function for converting HDR video into SDR video. For example, dynamic_range_mapping_info_type or color_gamut_mapping_info_type may be used as the information about the transfer function, and the HDR metadata may additionally signal use of the information to convert HDR video into SDR video as necessary.

Next, a case in which the display included in the receiver is an HDR display will be described. This corresponds to a case in which the display of the receiver is determined to be able to completely present decoded content. In this case, video quality can be enhanced using the common HDR metadata included in the HDR metadata, and video quality enhancement can be achieved using dynamic range mapping, color gamut mapping and viewing condition mapping. According to an embodiment, video quality enhancement for content using the common HDR metadata may be omitted when the scene/frame HDR metadata can be applied in the third step which will be described below. Further, video quality enhancement using the common HDR metadata may be realized using an additional module or applied in association with a post processing module which will be described with reference to FIG. 3.

In the third step, the receiver may perform video quality enhancement per scene of HDR video. When it is determined that the receiver can present HDR content on the basis of metadata information, the receiver may determine whether the receiver can process additional HDR metadata.

FIG. 2 shows a case in which scene-by-scene (or clip-by-clip or frame-by-frame) processing is additionally performed. In this case, it is possible to display HDR video with enhanced quality through detailed dynamic conversion per scene, video clip or frame of content using metadata provided on a scene-by-scene or frame-by-frame basis. Here, a broadcast transmission device can cause the receiver to identify transmission of information in units of scene or frame through a supplemental enhancement information (SEI) message using HDR_info_type according to an embodiment of the present invention. Furthermore, the broadcast transmission device can provide, to the receiver, information about a time at which the information in units of scene or frame needs to be applied using sync_info_type, sync_start and sync_duration. The receiver can identify transmission of the information in units of scene, video clip or frame through HDR_info_type and acquire timing information about the time at which the information in units of scene or frame is applied through sync_info_type, sync_start and sync_duration. In addition, the receiver may convert the timing information provided through metadata into information for synchronization with images as necessary.

In addition, the broadcast transmission device may inform the receiver of the type of metadata in units of scene, video clip or frame which will be provided when providing the common HDR metadata. The broadcast transmission device may previously inform the receiver of the aforementioned information through HDR_video_enhancement_info_present_type. That is, the receiver can acquire information about whether the scene/frame HDR metadata is received and the type thereof from the common HDR metadata and prepare to operate a related module. According to an embodiment, the broadcast transmission device may indicate the fact that the metadata in units of frame, video clip or scene is provided or indicate presence of information in units of frame, video clip or scene using the common HDR metadata. For example, the broadcast transmission device can indicate provision of dynamic range mapping and/or color gamut mapping information in units of frame or scene using the common HDR metadata.

According to an embodiment, the receiver may apply the common HDR metadata and scene HDR metadata to HDR video in stages or apply the same through one operation. Further, the receiver may apply the common HDR metadata and scene HDR metadata to the HDR video per dynamic range mapping and color gamut mapping or apply the same through one transfer formula.

Figure 3:
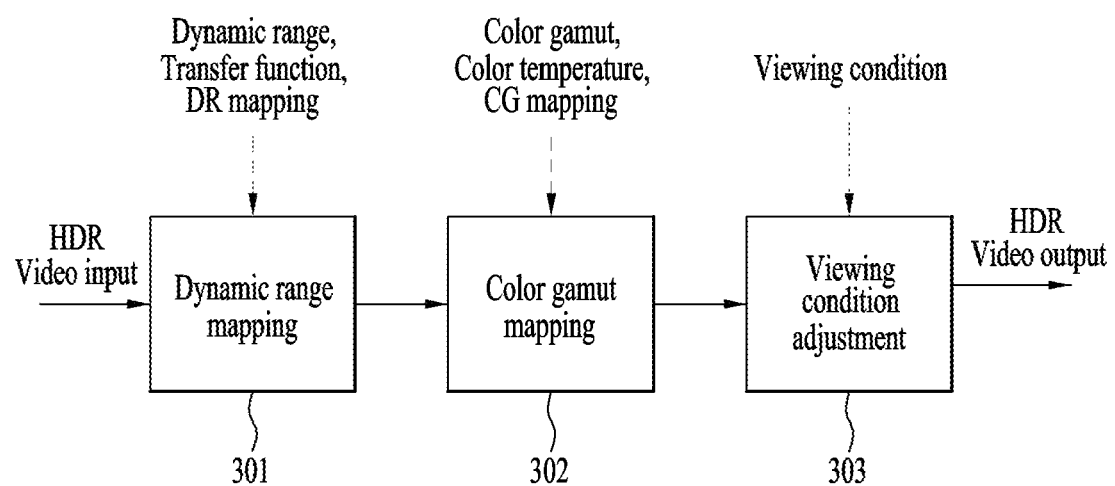
FIG. 3 illustrates a post processor according to an embodiment of the present invention.

FIG. 3 illustrates a post processor according to an embodiment of the present invention. In the present invention, the post processor may include a dynamic range (DR) mapping block 301, a color gamut (CG) mapping block 302 and a viewing condition adjustment block 303. The post processor may receive HDR video data and perform video quality enhancement using dynamic range mapping, color gamut mapping and viewing condition mapping. The DR mapping block 301 may perform video quality enhancement by applying dynamic range information, transfer function information and DR mapping information to the input HDR video data. The CG mapping block 302 may perform video quality enhancement by applying color gamut information, color temperature information and CG mapping information to the input HDR video data. The viewing condition adjustment block 303 may perform video quality enhancement by applying viewing condition information to the HDR video data. Details of the information will be described below with reference to FIGS. 4 to 16.

FIGS. 4 to 7 illustrate syntaxes of an SEI message and HDR information descriptors according to an embodiment of the present invention.

An SEI message may include an HDR information descriptor, and the HDR information descriptor may include at least one of the following fields. In the present invention, HDR information may have the same meaning as HDR video information.

HDR_info_type can indicate an information application unit in the HDR information descriptor. For example, HDR_info_type may indicate information about mastering display or may be commonly applied in units of channel, program and content. Further, HDR_info_type may be used to discriminate HDR information by being applied to continuous scenes, video clips or frames. Additionally, HDR information may be classified through other methods (e.g., depending on states before and after conversion, a transmission format, a target format after conversion, static/dynamic metadata, etc.).

Types of HDR information defied in the current payloadType can be discriminated as described above. Here, only detailed information corresponding to a single HDR_info_type may be described or two or more pieces of information may be described in the payloadType as in the embodiment of FIG. 4. In this case, a syntax may be configured such that pieces of information classified in accordance with HDR_info_type are continuously positioned.

In addition to the method of defining an information application unit in an SEI message, the information application unit may be defined by allocating different payloadType to pieces of HDR information. For example, HDR information can be classified such that payloadType=52 (mastering display), payloadType=53 (channel), payloadType=54 (program), payloadType=55 (content), payloadType=56 (scene), payloadType=57 (clip) and payloadType=58 (frame).

Transition_flag is a signal regarding an end time of content associated with an SEI message. For example, when HDR content is ended and switched to SDR content, transition_flag is set to 1 for the last frame. This can represent termination of transmission of the HDR information descriptor depending on application field. The receiver may turn off a module related to the HDR information descriptor on the basis of this signal. When the receiver is divided into a set-top box (STB) and a display device which are connected through a wired/wireless interface (e.g., HDMI, display port, MHL or the like), information, similar to the transition_flag, which represents that HDR related information transmission is stopped or HDR content is finished may be delivered from the STB to the display device. The transition_flag may indicate a content end time in a frame in which the HDR information descriptor is ended. A content end time may be indicated in an RAP including an end frame if previously set.

Set_number can indicate an identification number unique to an HDR information descriptor. That is, when a plurality of HDR information descriptors is delivered in units of time or frame from the broadcast transmission device to the receiver, the set_number can discriminate the HDR information descriptors. The set_number may discriminate a plurality of descriptors for each of a channel, a program, content, a frame, a scene and a clip in association with the aforementioned HDR_info_type as necessary. For example, when different DR mapping functions are delivered in order to supply displays having various types of luminance, the set_number can discriminate a plurality of descriptors for each of a channel, a program, content, a frame, a scene and a clip in association with the aforementioned HDR_info_type.

Version_number can indicate the version of the HDR information descriptor. The version_number can indicate an information change in the current descriptor in association with at least one of HDR_info_type and set_number. For example, when a descriptor having the same HDR_info_type and/or the same set_number has the same version number as the previous version number, information in a metadata processor can be applied as it is to images. When the version_number is changed, however, the broadcast reception device can update information in a metadata buffer and apply new information to video.

DR flag (dynamic_range_mapping_info_present_flag) can indicate that dynamic range mapping related information is included in the descriptor.

CG flag (Color_gamut_mapping_info_present_flag) can indicate that gamut mapping related information is included in the descriptor.

Viewing_condition_info_present_flag can indicate that viewing condition related information is included in the descriptor.

Number_of_HDR_video_enhancement info indicates the number of pieces of related information when there is an additional SEI message related to the current SEI message. The number_of_HDR_video_enhancement_info may provide enhanced information. For example, when information HDR_info_type=0011 (content) is delivered, information about mastering display and scenes may be transmitted in association with the number_of_HDR_video_enhancement_info. In this case, the number_of_HDR_video_enhancement_info is 3. Here, the receiver can use only information in content depending on performance when performing video quality processing such as tone mapping, gamut mapping and the like. Furthermore, the receiver may use only information of HDR_info_type=0100 (scene), for example, or use all information according to an embodiment, upon determining that the receiver has detailed information.

HDR_video_enhancement_info_present_type indicates the type of additional information related to the current SEI message and may be defined using the same value as HDR_info_type of FIG. 5. Here, this information can indicate whether information related to DR mapping, gamut mapping and viewing condition is transmitted through enh_dynamic_range_mapping_info_present_flag, enh_color_gamut_mapping_info_present_flag and enh_viewing_condition_info_present_flag and can be used when a receiver operation for information processing is prepared or whether more enhanced information than current information is used is determined.

Enh_dynamic_range_mapping_info_present_flag can indicate presence of DR mapping information for related metadata information when set to 1.

Enh_color_gamut_mapping_info_present_flag can indicate presence of gamut mapping information for related metadata information when set to 1.

Enh_viewing_condition_info_present_flag can indicate presence of viewing condition information for related metadata information when set to 1.

When the metadata type is specified by a payloadType value of an SEI message instead of HDR info, the payloadType value of the SEI message can be directly transmitted in addition to the aforementioned method of using HDR_info_type and flags related thereto. That is, payloadType=52 (mastering display) and payloadType=56 (scene) can be transmitted as additional (enhancement) information related to payloadType=53 (content) in the above example. Alternatively, payloadType may be added and provided along with HDR_info_type.

Sync_info_type can indicate a method of representing information for synchronization with content, scenes, clips or frames to which information in the HDR information descriptor needs to be applied. For example, sync_info_type can deliver a picture order count (POC) value used in a decoder or directly deliver a pic_order_count_lsb value. In the case of storage media, media time information can be used, and the number of accumulated frames on the basis of a reference time for video start may be decided as sync_info_type.

Sync_start is information related to synchronization start time. When information is delivered in a specific period such as an RAP instead of being delivered per frame, it is necessary to connect the start and end of a period in which the information is used to video frames. The present invention may apply an embodiment of representing start information of the period or a frame to which the corresponding information is applied as information such as a time, a POC, the number of frames or PTS in association with sync_info_type using sync_start. Sync_info_type can define a synchronization information type as a time, a time difference, start order, a POC (picture order count), PTS or the number of aggregated frames.

For example, it is possible to consider a case in which three pieces of metadata are applied to 2 seconds (start time), 2.5 seconds and 3.5 seconds within an RAP of 2 to 4 seconds for a 50 fps video stream having an RAP interval of 2 seconds.

When sync_info_type=0x00, the synchronization information type can be set to time and sync start information of the metadata can be delivered as 2000, 2500 and 3500. Additionally, sync_duration can be signaled as 500, 1000 and 1000. Here, a reference time may be needed for determination of time. In this case, the reference time may be additionally signaled in such a manner that a time is defined in an adaptation field of a TS header.

When sync_info_type=0x01, the synchronization information type can be set to a time difference. The broadcast transmission device can inform the receiver of immediate application of metadata, application of the metadata after 0.5 seconds from RAP and application of metadata after 1.5 seconds from RAP by signaling sync_start=0, 500 and 1000.

When sync_info_type=0x02, the synchronization information type can be set to a start order and the order can be signaled like sync_start=0, 1, 2. When the start order is signaled, the receiver can apply synchronization information in the order at a specific interval. The specific interval may be a fixed value or may be a value determined in the order. For example, 0 can indicate immediate application, 1 can indicate application after 0.5 seconds from RAP, and 2 can indicate application after 1.5 seconds after RAP.

When sync_info_type=0x03, the synchronization information type can be set to a POC. In this case, 100, 125 and 175 may be delivered as POC values of video at metadata application timing, and 25, 50 and 50 may be delivered as duration values which will be described below depending on the unit of the POC. Further, values related to a POC in a video codec syntax may be directly delivered.

When a PTS (presentation time stamp) and the number of frames are signaled, a metadata application timing can be indicated through the PTS and the number of frames similarly to the aforementioned example of the POC.

Sync_duration is information about a duration starting from sync_start. A synchronization expiration timing can be calculated as sync_start+sync_duration as in the aforementioned example, and synchronization expiration timing information may be directly delivered along with or instead of sync_duration as necessary. In the case of live broadcast, an expiration time cannot be determined in advance and thus may be set to a predetermined value such as FFFF. If the metadata application timing can be determined only with the sync_start information, sync_duration may not be used. In this case, sync_duration may be used as a flag that provides additional information such as information indicating whether other metadata is transmitted following the corresponding metadata.

Number_of_dynamic_range_info can indicate the number of methods of representing dynamic range information corresponding to mastering display, a channel, a program, content, a scene, a clip or a frame.

Dynamic_range_info_type indicates a method of representing dynamic range information corresponding to mastering display, video, a scene or a frame. Methods for representing a dynamic range may be as shown in the lower part of FIG. 6. Dynamic range can be represented using at least one of maximum luminance, minimum luminance, average luminance, and an average or median value composed of a specific component. Further, white may be subdivided into normal white, diffuse white and specular white according to characteristics and black may be classified into normal black, deep black and pitch dark according to characteristics and presented.

As described in the example below, the broadcast transmission device can subdivide and represent luminance of a bright part and a dark part of content by providing information such as specular white and pitch dark through HDR info, and such information can be used as a criterion for determination of receiver display conditions or as information for mapping according to display conditions.

A DR information value dynamic_range_info_value can deliver a corresponding value according to dynamic_range_info_type. That is, content, mastering display and scene DR can be represented in detail according to dynamic_range_info_type as described below. Further, the DR information value may be used to separately describe a container video format and characteristics of actual content.

Ex) Content: peak_luminance_level=2000(nit),minimum_luminance_level=0.1(nit)

Mastering display: peak_luminance_level=4000(nit), minimum_luminance_level=0.01(nit)

Scene: white_level_A=800(nit),white_level_B=1500(nit),black_level_A=1(nit),black_level_B=0.1(nit)

Transfer_function_type can indicate the type of a transfer function used for mastering display, a channel, a program, content, a scene, a clip or a frame of HDR video. For example, a predetermined EOTF such as SMPTE ST 2084, ITU BT.1886 and BT.2020 can be signaled. Luminance representation methods may be divided into an absolute luminance representation method and a relative luminance representation method depending on the type of a transfer function and a specific method may be signaled. A coefficient of an arbitrary transfer function may be delivered as necessary.

Color_gamut_type can indicate a color gamut type corresponding to mastering display, a channel, a program, content, a scene, a clip or a frame of HDR video. For example, color_gamut_type can indicate a standard color gamut such as BT.709, BT.2020 and DCI-P3 or indicate an arbitrary color gamut through RGB color primary (XYZ, RGBW and the like may be used) as necessary.

Color_temperature_type can indicate information about standard white corresponding to mastering display, a channel, a program, content, a scene, a clip or a frame of a color gamut. For example, color_temperature_type may be a standard light source color temperature such as D65 and D50 and may indicate an arbitrary value representative of a color temperature such as RGB color primary (XYZ, RGBW and the like are possible) with respect to white as necessary.

Dynamic_range_mapping_info_type indicates the type of dynamic range mapping information corresponding to mastering display, a channel, a program, content, a scene, a clip or a frame. For example, dynamic_range_mapping_info_type can refer to a knee function information SEI message or a tone mapping information SEI message included in HEVC, as shown in the upper part of FIG. 7. Furthermore, dynamic_range_mapping_info_type may be directly described in a predetermined HDR information descriptor.

Color_gamut_mapping_info_type indicates the type of color gamut mapping information corresponding to mastering display, a channel, a program, content, a scene, a clip or a frame. For example, color_gamut_mapping_info_type can refer to information defined in a color remapping information SEI message included in HEVC, as shown in the lower part of FIG. 7. Further, color_gamut_mapping_info_type may be directly described in a predetermined HDR information descriptor.

Viewing_condition_info_type indicates the type of viewing condition information corresponding to mastering display, a channel, a program, content, a scene, a clip or a frame. For example, viewing_condition_info_type may refer to information defined in viewing_condition defined as a separate SEI message and may be directly described in a predetermined HDR information descriptor.

When an external SEI message is referred to for the aforementioned dynamic_range_mapping_info_type, color_gamut_mapping_info_type and viewing_condition_info_type, a method of directly signaling payloadType of the SEI message may be used, distinguished from the aforementioned method. For example, when a knee function information SEI message is referred to, a signaling method using dynamic range mapping info type=0 and payloadType=141 may be used.

Figure 8:
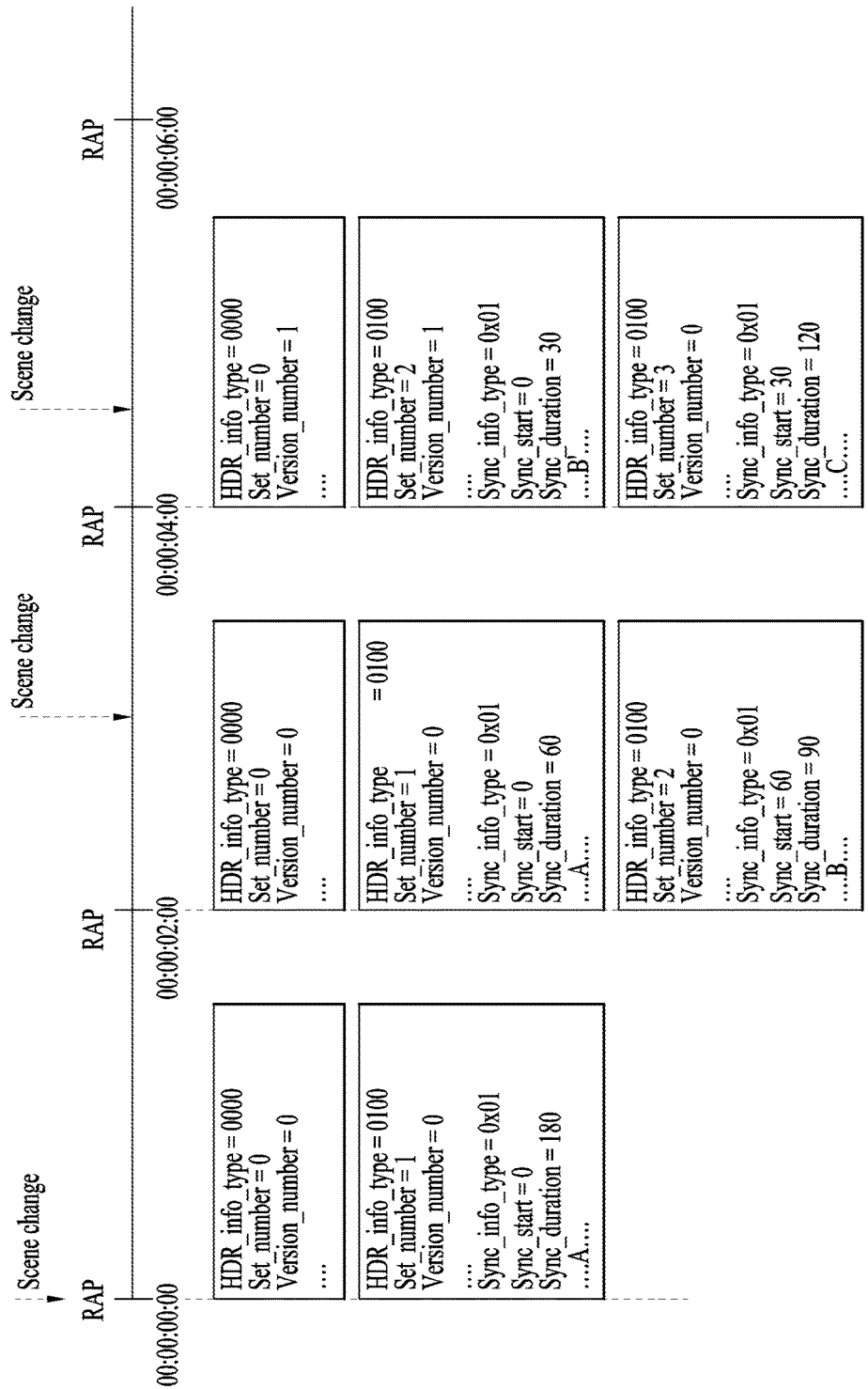
FIGS. 8 and 9 illustrate an embodiment of signaling metadata information according to RAP.

FIG. 8 illustrates a method of signaling metadata information with time according to an embodiment of the present invention.

For metadata transmission with time, various methods such as 1) a method of transmitting all of corresponding information for each frame, 2) a method of transmitting metadata in frames corresponding to a period in which the metadata is changed and applied within an RAP, 3) a method of simultaneously transmitting metadata applied within a period such as an RAP in the period, and 4) a method of transmitting metadata prior to an RAP related to an application timing can be considered. Further, a combination of methods 1) to 4) may be used.

FIG. 8 illustrates an embodiment of signaling metadata information according to RAP. The common type applied to entire video can be transmitted in each RAP. This corresponds to a case in which HDR_info_type is set to 0000 in FIG. 8. Although the common type is repetitive information, the broadcast transmission device can compensate for information loss due to transmission error by transmitting the common type per RAP.

When information applied differently for each scene needs to be provided, the information may be transmitted using scene metadata. This corresponds to a case in which HDR_info_type is set to 0100 in FIG. 8. In this case, information corresponding to an RAP and information applied after scene change in the RAP can be transmitted together. Information corresponding to an RAP and information applied after scene change in the RAP may be defined as sets having different roles and may be discriminated from each other by being assigned different set numbers. According to an embodiment, when pieces of information having different roles are separately delivered even though the information is applied to the same scene, different set numbers can be used to discriminate the information. When information is applied over two or more RAPs, the information has the same set_number and, when detailed information is not updated, the same version_number is set for the information. When detailed information is changed, the information may have a different version_number such that the metadata processor can identify a set having updated information and determine whether to perform update. When the next RAP arrives, a scene start time changes to the new RAP and thus sync_start can change to the new RAP and can be applied. In this case, when a sync duration end point (sync_start+sync_duration) is not changed, the same version_number can be applied upon determining that there is no information change.

When application information is previously transmitted before arrival of an RAP related to a metadata application timing used in a program, application timing can be signaled through a relative concept such as time difference, order and number of frames. In this case, it may be possible to signal that the corresponding metadata is not applied in the corresponding RAP but will be applied later using predetermined signaling such as sync_start=FFFF or a method of signaling with a longer duration than an RAP.

In FIG. 8, sync_start=0 and sync_duration=180 can be set for the second HDR_info_type=0100 in a period of 00:00:00:00 to 00:00:02:00, and sync_start=0 and sync_duration=60 can be set for the second HDR_info_type=0100 in a period of 0:00:02:00 to 00:00:04:00. As start time changes from 00:00:00:00 to 00:00:02:00, duration can be changed and signaled for the same information (set 1, ver 0). The receiver does not perform metadata update when it is confirmed that the metadata has not been changed.

When details of information that plays the same role as previous information have been changed, the broadcast transmission device can increase version_number of common HDR metadata while maintaining set_number thereof. The metadata processor of the receiver can recognize information change on the basis of changed version_number and update previous information to new information.

When information has been changed in the metadata in a period of 00:00:04:00 to 00:00:06:00 as shown in FIG. 8, information such as start time may be additionally delivered. When information has been changed in the metadata, for example, when information B has been changed to information B', a new version number can be assigned. It can be confirmed from the figure that the version number for set_number=2 is 0 in the period of 00:00:02:00 to 00:00:04:00 but the version number has increased to 1 in the period of 00:00:04:00 to 00:00:06:00. It is also possible to signal that update needs to be performed when expiration time is changed.

Figure 9:
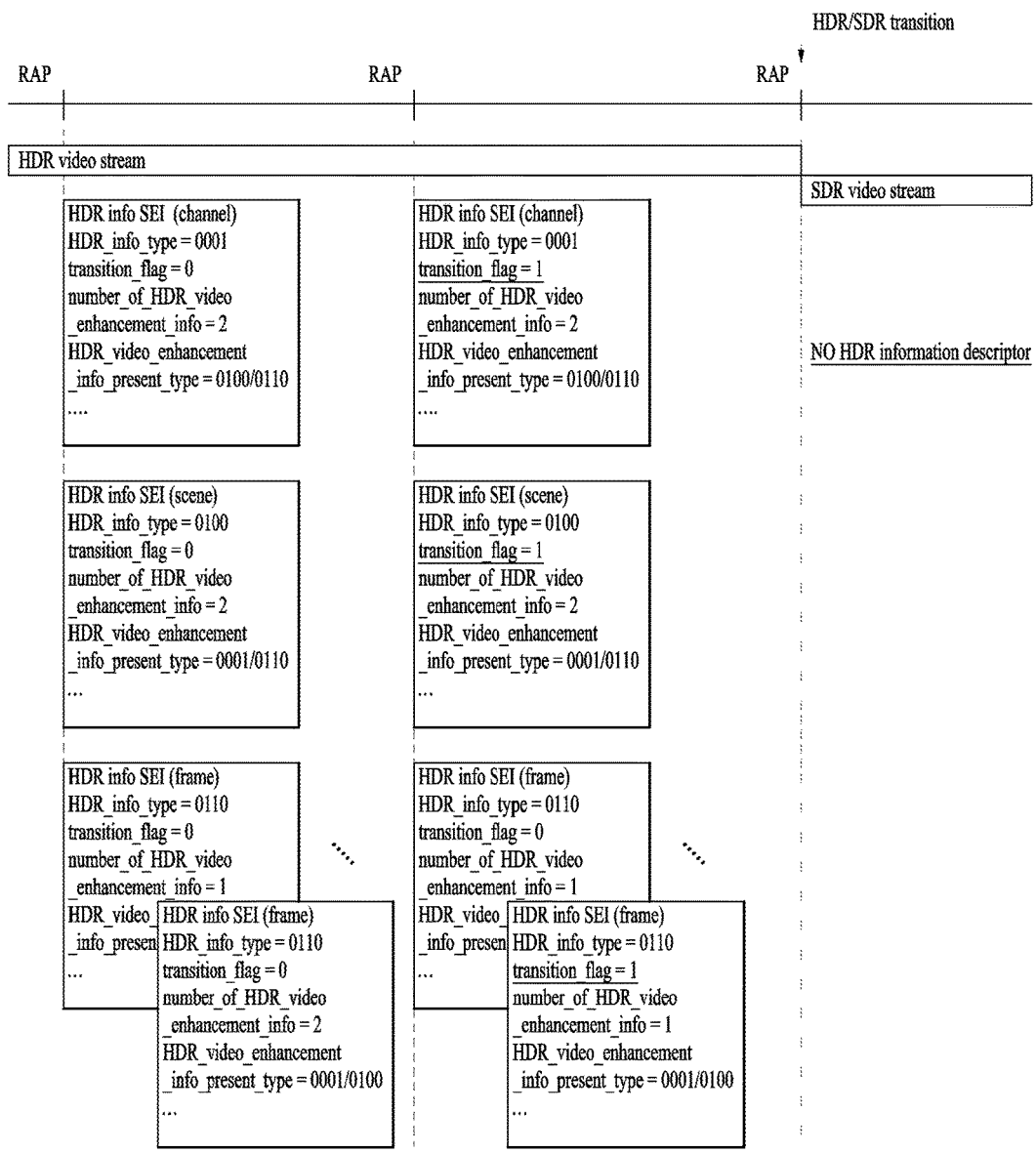

FIG. 9 illustrates a method of signaling metadata information with time according to another embodiment of the present invention. FIG. 9 shows a case in which there is transition between HDR and SDR in signaling of metadata information. As shown, transition of an HDR video stream to an SDR video stream occurs in the third RAP. In this case, the HDR information descriptor is transmitted and received no longer after the third RAP.

When transmission of the HDR information descriptor is stopped, the broadcast transmission device can notify the receiver that transmission of the HDR information descriptor is stopped through transition_flag. In the case of transition of content DR from HDR to SDR, transmission of an SEI message delivering video properties of HDR/WCG content is stopped and no more information may be transmitted after a content transition time. Although the HDR information descriptor such as mastering display information, color gamut mapping and viewing condition may be used for SDR content, of course, legacy SDR content that does not use the HDR information descriptor can be considered in the present example. In this case, a transition_flag on time, that is, a time at which the transition_flag is set to 1 is important. As in the above example, the transition_flag can be set to 0 in a frame immediately before the transition time and the RAP (the second RAP in the figure) including the frame.

FIG. 10 illustrates dynamic range_mapping_info according to an embodiment of the present invention. When dynamic_range_mapping_info_type described above with reference to the upper part of FIG. 7 is set to 0x03, dynamic_range_mapping_info( ) can be directly defined in the HDR_info descriptor. When HDR_info_type is a channel, a program or content as common HDR metadata related to mastering display or video, information described in FIG. 9 can be used for the entire video (channel, program or content). When HDR_info_type is scene type or frame type as scene/frame HDR metadata, the information described in FIG. 9 can be used for a corresponding section. Fields included in dynamic_range_mapping_info( ) will be described below.

Dynamic_range_mapping_info( ) according to an embodiment of the present invention may include luminance_max, luminance_min, private_EOTF, number_of_coeff, transfer_curve_coeff[i], clipping_flag, linear_mapping_flag, luma_clipping_upper_bound, luma_clipping_lower_bound, luminance_upper_bound, luminance_lower_bound, luma_upper_value, luma_lower_value, mid_DR_transformation_curve_type, mid_DR_transformation_curve( ), mid_DR_percentage, upper_DR_transformation_curve_type, upper_DR_transformation_curve( ), upper_DR_percentage, lower DR transformation_curve_type, lower_DR_transformation_curve( ), number_luminance_upper_bound_diff, luminance_upper_bound_diff[i], luma_upper_value_diff[i], upper_DR_transformation_curve_type[i], upper_DR_transformation_curve( ), upper_DR_percentage[i] and/or mid_DR_percentage[i].

Luminance_max indicates maximum reference luminance represented in UHD broadcast content. That is, this indicates a maximum value of dynamic range (DR). For example, in the case of a reference monitor, 100 cd/m^2 is decided as maximum reference luminance. In this case, 1, which is the quotient of a value obtained by dividing the above value by 100 (decimal number) in consideration of a general range, can be transmitted.

Luminance_min indicates minimum reference luminance represented in UHD broadcast content. That is, this indicates a minimum value of the dynamic range. For example, in the case of a reference monitor, 0.05 cd/m^2 is decided as minimum reference luminance. In this case, 5 obtained by multiplying the above value by 100 (decimal number) in consideration of a general range can be transmitted.

Private_EOTF indicates whether any EOTF function is used. This can be delivered through VUI information when a widely-used EOTF such as ITU-R BT.1886, REC.709 and BT.2020 is used. However, when an EOTF which has not been decided as a standard is used, the corresponding field value can be set to 1. For example, perceptual quantization can be used as an EOTF which has not been decided as standard, that is, arbitrary EOTF.

number_of_coeff indicates the number of coefficients used for an arbitrary EOTF.

transfer_curve_coeff[i] indicates a coefficient used for an arbitrary EOTF.

clipping_flag indicates whether a clipping option is used and can have a value of 1 when use of the clipping option is permitted.

linear_mapping_flag indicates whether a linear dynamic range transformation method is used. When the linear dynamic range transformation method is used, linear_mapping_flag has a value of 1.

luma_clipping_upper_bound indicates a digital value of an upper critical point in a dynamic range (DR) displayed when the clipping option is used.

luma_clipping_lower_bound indicates a digital value of a lower critical point in the dynamic range (DR) displayed when the clipping option is used.

luminance_upper_bound indicates a maximum value (in nit) of a dynamic range that needs to be mandatorily represented among dynamic ranges represented in UHD broadcast content. luminance_upper_bound may be a criterion for determination of a display type of a receiving device. Further, luminance_upper_bound may signal an additional criterion for determination of a display type of a receiving device.

luminance_lower_bound indicates a minimum value (in nit) of a dynamic range that needs to be mandatorily represented among dynamic ranges represented in UHD broadcast content. luminance_lower_bound may be a criterion for determination of a display type of a receiving device. Further, luminance_lower bound may signal an additional criterion for determination of a display type of a receiving device.

luma_upper_value indicates a digital value corresponding to luminance_upper_bound.

luma_lower_value indicates a digital value corresponding to luminance_lower_bound.

mid_DR_transformation_curve_type identifies a DR transformation curve used in a mid dynamic range. One of a linear curve, an exponential curve, an S-curve, a logarithmic curve, a combination curve and a look-up table (LUT) may be used as a transformation curve.

mid_DR_transformation_curve( ) indicates additional information according to a transformation curve identified by mid_DR_transformation_curve_type. For example, gradient information can be transmitted when a linear curve is used, information on a base can be transmitted when an exponential curve or a logarithmic curve is used, information about coordinates of an inflection point and a base and a y-intercept of each section can be transmitted when an S-curve is used, and information about an x-coordinate of each section, a curve type of each section and the corresponding graph can be transmitted when a combination curve is used.

mid_DR_percentage indicates the percentage of a mid dynamic range among dynamic ranges of UHD broadcast content, which occupies the entire dynamic range of a receiver display.

upper_DR_transformation_curve_type identifies a dynamic range transformation curve used in an upper dynamic range. One of a linear curve, an exponential curve, an S-curve, a logarithmic curve, a combination curve and a look-up table (LUT) may be used as a transformation curve.

upper_DR_transformation_curve( ) indicates additional information according to a transformation curve identified by upper_DR_transformation_curve_type. For example, gradient information can be transmitted when a linear curve is used, information on a base can be transmitted when an exponential curve or a logarithmic curve is used, information about coordinates of an inflection point and a base and a y-intercept of each section can be transmitted when an S-curve is used, and information about an x-coordinate of each section, a curve type of each section and the corresponding graph can be transmitted when a combination curve is used.

upper_DR_percentage indicates the percentage of an upper dynamic range among dynamic ranges of UHD broadcast content, which occupies the entire dynamic range of a receiver display.

lower_DR_transformation_curve_type identifies a dynamic range transformation curve used in a lower dynamic range. One of a linear curve, an exponential curve, an S-curve, a logarithmic curve, a combination curve and a look-up table (LUT) may be used as a transformation curve.

lower_DR_transformation_curve( ) indicates additional information according to a transformation curve identified by lower_DR_transformation_curve_type. For example, gradient information can be transmitted when a linear curve is used, information on a base can be transmitted when an exponential curve or a logarithmic curve is used, information about coordinates of an inflection point and a base and a y-intercept of each section can be transmitted when an S-curve is used, and information about an x-coordinate of each section, a curve type of each section and the corresponding graph can be transmitted when a combination curve is used.

number_luminance_upper_bound_diff indicates the number of variables used to extend a mid dynamic range.

luminance_upper_bound_diff[i] indicates a difference value for constituting an (i+1)-th luminance value in UHD broadcast content. When a mid dynamic range is extended in a display which has a wider dynamic range than an existing dynamic range but cannot accommodate all dynamic ranges represented in UHD broadcast content (case 2), luminance_upper_bound can be changed to a value indicated by luminance_upper_bound+luminance_upper_bound_diff[0]+ . . . +luminance_upper_bound_diff[i].

luma_upper_value_diff[i] indicates a digital value corresponding to an (i+1)-th luminance value in UHD broadcast content. When a mid dynamic range is extended in a display which has a wider dynamic range than an existing dynamic range but cannot accommodate all dynamic ranges represented in UHD broadcast content (case 2), luma_upper_value can be changed to a value indicated by luma_upper_value+luma_upper_value_diff[0]+ . . . +luma upper value diff[i].

upper_DR_transformation_curve_type[i] can identify a transformation curve used in a changed upper dynamic range when an (i+1)-th dynamic range is supported. That is, when a mid dynamic range is extended, upper_DR_transformation_curve_type[i] can identify a transformation curve used in an upper dynamic range changed according to the extended mid dynamic range.

upper_DR_transformation_curve( ) indicates additional information according to a transformation curve identified by upper_DR_transformation_curve_type[i]. That is, upper_DR_transformation_curve( ) indicates details of a transformation curve used in a changed upper dynamic range when an (i+1)-th dynamic range is supported.

upper_DR_percentage[i] indicates the percentage of a changed upper dynamic range, which occupies the entire dynamic range of a receiver display, when a mid dynamic range of UHD broadcast content is changed.

mid_DR_percentage[i] indicates the percentage of a changed mid dynamic range which occupies the entire dynamic range of a receiver display when a mid dynamic range of UHD broadcast content is changed.

FIG. 11 illustrates a case in which an SEI message defined in HEVC according to an embodiment of the present invention is referenced. When color_gamut_mapping_info_type described in the lower part of FIG. 7 is set to 0x00, gamut_mapping_info( ) is not directly defined in HDR_video_info descriptor and the SEI message defined in HEVC can be referred to. Here, the SEI message can comply with a color remapping information SEI message syntax defined in HEVC.

When HDR_info_type is a channel, a program or content as common HDR metadata related to mastering display or video, referenced information can be used for the entire video (channel, program or content). When HDR_video_info_type is scene type or frame type as scene/frame HDR metadata, referenced information can be applied only to a corresponding section.

FIGS. 12 and 13 illustrate an embodiment of signaling HDR_info descriptor according to an embodiment of the present invention through a PMT. The PMT refers to a program mapping table and may include table ID information, section syntax indicator information, section length information, program number information, version number information, current_next indicator information, section number information, PCR_PID information, program info length information, first descriptor information, stream type information, elementary PID information, elementary stream length (Es_info_length) information, second descriptor information, CRC information, etc. The first descriptor information can refer to descriptor information included in the first loop following the program info length information and the second descriptor information can refer to descriptor information included in the second loop following the Es_info_length information.

UHD_program_info_descriptor according to an embodiment of the present invention can be signaled by being included in the first descriptor information included in the PMT, and the aforementioned HDR_info descriptor can be signaled by being included in the second descriptor information included in the PMT.

UHD_program_info_descriptor may include at least one of descriptor_tag, descriptor_length and UHD_service_type as shown in the upper part of FIG. 12. Here, UHD service type can refer to the type of a UHD service as shown in the lower part of FIG. 12. For example, UHD_service_type can indicate a UHD service type designated by a user, such as UHD1(4K), UHD2(8K) or a type classified by quality. Various UHD services can be provided to a receiver through UHD_service_type. The present invention can indicate provision of HDR info regarding different stages or units such as video, scenes, clips or frames by setting UHD_service_type=1100 (UHD1 service with HDR information metadata; an example of 4K).

FIGS. 14 and 15 illustrate an embodiment of signaling HDR_info descriptor according to an embodiment of the present invention through an EIT. ATSC and DVB systems may include the EIT as a signaling table. Syntaxes included in the EIT are shown in FIGS. 14 and 15.

The EIT (Event Information Table) of ATSC and DVB systems according to an embodiment of the present invention may commonly include a table_id field, a section_syntax_indicator field, a section_length field, a source_id (service_id) field, a version_number field, a current_next_indicator field, a section_number field, a last_section_number field, a num_events_in_section (segment_last_section_number) field, an event_id field, a start_time field, a length_in_seconds (duration) field, a descriptors_length field, a descriptor( ) field and/or a CRC_32 field.

The table_id field indicates that the corresponding table is an EIT (Event Information Table). The section_syntax_indicator field is a 1-bit field which is set to 1 to indicate a long format of an MPEG-2 private_section table. The section_length field indicates the length of a table section following this field in bytes. The source_id field indicates a source ID of a virtual channel carrying an event described in the corresponding section. The version_number field is a 5-bit field indicating a version number of the table. The current_next_indicator field is a 1-bit field which indicates whether the table is currently applicable or applicable later. The section_number field indicates a section number. The last_section_number field identifies the number of the last section. The num_events_in_section field indicates the number of events included in the corresponding table section. The event_id field identifies a specific number indicating a described event. The start_time field indicates a start time of the corresponding event on the basis of GPS time in seconds. A value indicating a start time of an event may be greater than a value indicating an expiration time of an event which is being broadcast on a virtual channel. The expiration time of an event can be defined as the sum of the start time of the event and the duration of the event. The length_in_seconds (duration) field indicates a duration of an event in seconds. The descriptors length field indicates the length of descriptor ( ) described following this field. The descriptor( ) is a descriptor loop located within the table. The descriptor loop may include an additional descriptor. The EIT may include zero or more descriptors, and the relevant descriptor may correspond to an event level descriptor which describes information applied to each event. According to an embodiment of the present invention, UHD_program_info descriptor and HDR_info descriptor can be included in the event level descriptor and delivered. UHD_program_info_descriptor may be used to identify a UHD service type. Whether HDR info descriptor includes HDR video information metadata may be checked at the event level, and HDR_video_info descriptor may be used to determine whether a receiver can accommodate the HDR video information metadata. In the case of cable broadcast, the same information may be provided to an AEIT instead of the aforementioned descriptors.

The CRC_32 field includes a CRC value used to check data integrity. The CRC value can guarantee output of "0" from a register included in a decoder defined in Annex A of ISO-13818-1 "MPEG-2 Systems" after all EIT sections are processed.

When UHD_service_type of UHD_program info descriptor signaled through the EIT is set to 1100, the receiver can confirm that information about an appropriate viewing condition is delivered through metadata. For example, when UHD_service_type is 1100, the receiver can confirm that the corresponding service is UHD1 service with HDR video information metadata, 4K.

When UHD_service_type of UHD_program_info_descriptor signaled through the EIT is set to 0000, the receiver can check whether HDR_info_descriptor( ) is present and recognize provision of HDR info regarding different stages or units such as video, scenes or frames. Here, UHD_service_type of 0000 can indicate UHD1 service.

In the above case, it is possible to determine whether information in units of mastering display, content, scene or frame, which a content provider desires, can be used in a viewer's display using HDR_info_descriptor( ). By using HDR_info_descriptor( ) it is possible to predetermine whether content, scene or frame based metadata is used for content currently played or played later and a receiver can prepare setting for a situation such as scheduled recording.

FIG. 16 illustrates HDR_info_descriptor( ) according to another embodiment of the present invention. A plurality of pieces of information may be present for one event. That is, information is not consistently applied to content but applied information can be changed according to time or presence/absence of inserted content. Alternatively, various modes intended by a producer may be supported for one piece of content. Here, it is necessary to determine whether a receiver display can accommodate such modes, and information thereabout can be provided by a broadcast transmission device through viewing_condition_metadata. A syntax in viewing_condition_metadata can comply with the definition of the viewing condition descriptor of the SEI message.

HDR_info_descriptor may include at least one of descriptor_tag, descriptor_length and number_of_info as shown in the upper part of FIG. 16. HDR_info_descriptor may include a loop and can include as many pieces of HDR_info_metadata( ) as the number indicated by number_of_info. The syntax of HDR_info_metadata( ) may deliver the script or part thereof of the HDR information descriptor configuration of FIG. 4.

Figure 17:
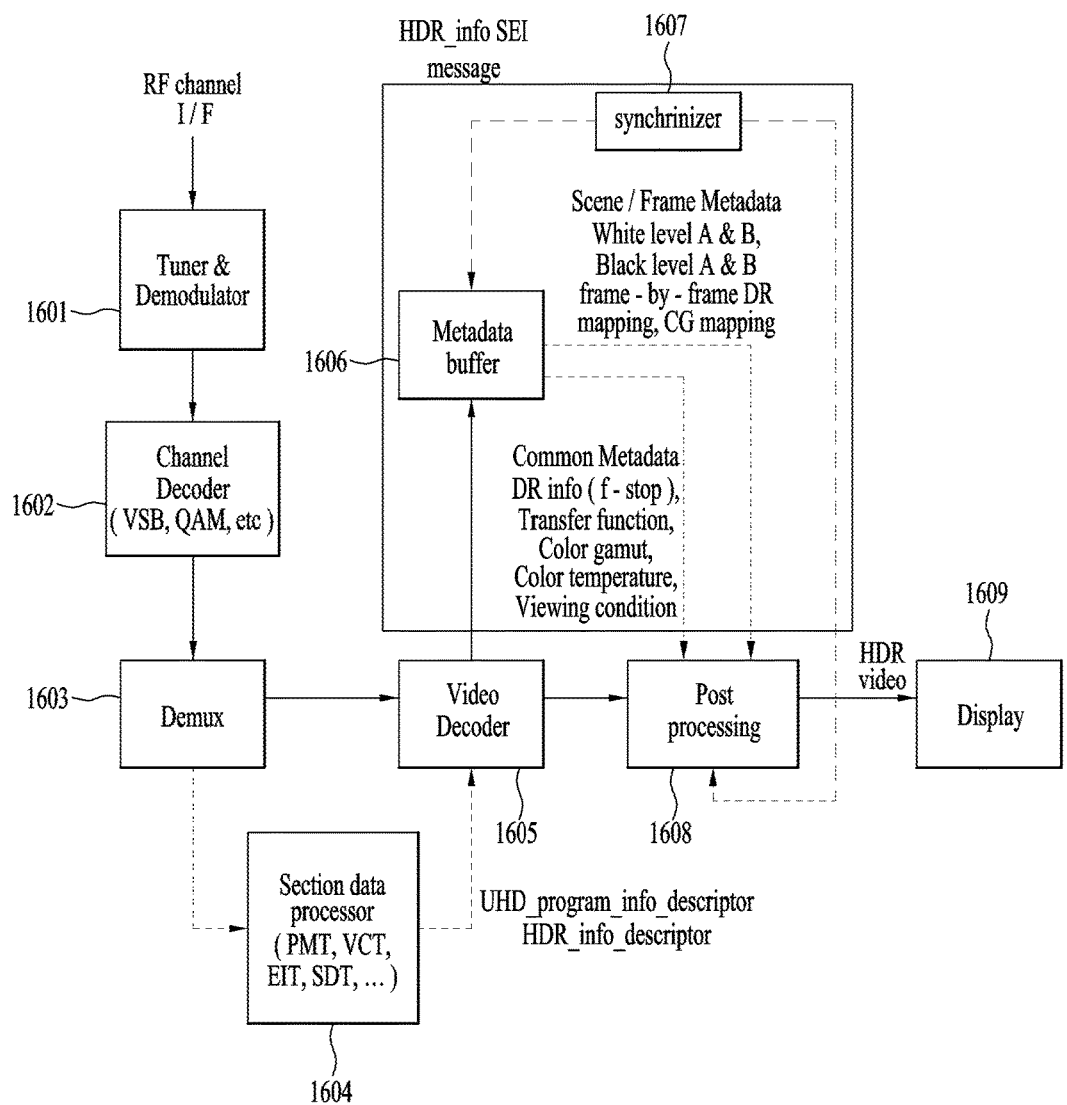
FIG. 17 is a block diagram of a receiver and illustrates operation of the receiver according to an embodiment of the present invention.

FIG. 17 is a block diagram of a receiver, which illustrates an operation method according to an embodiment of the present invention. When HDR information is transmitted through the aforementioned method, the receiver analyzes a signal and applies information to HDR video on the basis of the analyzed signal through the following process.

The receiver according to an embodiment of the present invention may receive a broadcast signal from a radio frequency (RF) channel using a tuner and a demodulator 1601. The broadcast signal may be received through other paths (not shown) as well as an RF channel. For example, the broadcast signal can be received through IP based broadcast/communication, wired/wireless communication and wired/wireless interfaces. Further, the broadcast signal and metadata which will be described below may be received through different paths. The metadata which will be described below may be transmitted and received through other paths (e.g., IP based broadcast/communication, wired/wireless communication, wired/wireless interfaces, short-range wireless communication, etc.) as well as broadcast signals.

The receiver may decode the received broadcast signal using a channel decoder 1602. Here, the channel decoder may decode the broadcast signal using VSB or QAM. The decoded broadcast signal may be demultiplexed into broadcast content data and signaling data by a demultiplexer 1603. The broadcast content data may include HDR video data and may be decoded by a video decoder 1605. The signaling data may include information about the broadcast content data and include a signaling table or signaling information such as a PMT, a VCT, an EIT or an SDT according to an embodiment. The receiver may extract UHD_program_info_descriptor from the signaling information (e.g., a PMT) using a section data processor 1604.

The receiver checks whether there are additional services or media that the receiver needs to additionally receive in order to constitute original UHDTV broadcast using UHD_program_info_descriptor. In an embodiment of the present invention, the receiver can recognize presence of additional information through an SEI message upon reception of UHD_service_type=1100. Alternatively, the receiver can recognize presence of video related additional information through an SEI message using an EIT upon receiving UHD_service_type=0000 (8K is 0001).

Upon confirmation of presence of additional information, the receiver can recognize whether a range to which the additional information is applied is a channel, a program, content, a scene, a clip or a frame on the basis of the HDR information SEI message or HDR_info_type. In addition, HDR_info_descriptor( ) can include information about the start time and expiration time of the additional information for synchronization of the additional information range for each case. In an embodiment, sync_info_type, sync_start and sync_duration which are information for synchronization on the basis of a video frame are used. Further, HDR_info_descriptor( ) can include transition_flag indicating HDR end time.

When HDR_video_info_type is information applied to entire content, signaling information can signal whether information in units of scene, clip or frame is additionally provided through HDR_video_enhancement_info_present_type. Accordingly, the receiver can recognize that information in units of scene, clip or frame is provided in advance and prepare settings for metadata processing in units of scene, flip or frame and HDR video quality enhancement.

The receiver may recognize the type of information regarding high contrast or information representing luminance as information capable or representing a dynamic range through signaling information using dynamic_range_info_type. For example, dynamic_range_info_type can indicate an aspect ratio and f-stop as high contrast information and indicate peak luminance and minimum luminance as luminance information. A value according to each type may be delivered to the receiver through dynamic_range_info_value[i]. Particularly, according to an embodiment of the present invention, dynamic ranges according to characteristics of content, mastering display, a frame and a scene can be represented, and luminance can be subdivided and represented through dynamic_range_info_type. In addition, the receiver can recognize an EOTF type, a color gamut type and a color temperature type used for color encoding through transfer_function_type, color_gamut_type and color_temperature_type.

HDR_info_descriptor( ) is additional information which provides dynamic range mapping, color gamut mapping and viewing condition information to the receiver. When various additional information provision methods are available, an SEI message defined in HEVC or a predetermined SEI message may be designated for each method through dynamic_range_mapping_info_type, color_gamut_mapping_info_type and viewing_condition_info_type. When additional information is directly defined in HDR_info descriptor, the receiver can recognize detailed information through dynamic_range_mapping_info( ), color_gamut_mapping_info( ) and viewing_condition_info( ).

The aforementioned signaling information may be stored in a metadata processor 1606 of the receiver. The stored signaling information may be updated when the aforementioned set number or version is changed. The receiver may synchronize video quality enhancement information (signaling information) stored in the metadata processor 1606 with video data using a synchronizer 1607 such that the video quality enhancement information can be applied to the video data according to an application unit.

The receiver may deliver dynamic range information in units of content, scene or frame to an HDR algorithm or a video quality enhancement unit such as an existing post processor 1608 (post-processing module) on the basis of information provided thereto, to achieve video quality enhancement. In addition, when there is detailed information related to dynamic range mapping, color gamut mapping and viewing condition information, the receiver may directly connect related modules such as tone mapping, color mapping, color correction and white balance modules to achieve video quality enhancement. If video processing is performed in a linear luminance domain in the receiver, EOTF recognized through transfer_function_type can be applied.

The receiver may display post-processed HDR video through a display unit 1609 to provide the HDR video to a user.

FIG. 18 illustrates an HDR information descriptor according to an embodiment of the present invention. To correctly apply HDR information proposed by the present invention, an input video format and an output video format need to be described in detail. That is, a broadcast signal transmission device may additionally signal information about video formats applied before and after processing of video data such that a broadcast signal reception device can perform more accurate color mapping. The shown information may be additionally included in the corresponding descriptor together with the information included in the HDR information descriptor described above with reference to FIG. 4. The shown information may be equally applied to processing of all HDR videos in an SEI message as in the present embodiment. Furthermore, the information may be defined for each type of HDR video processing, for example, color gamut mapping and dynamic range mapping to define different input/output properties.

Input_color_space_type information indicates a color gamut criterion among information about an image which is an HDR video processing target delivered in the present invention. As a color gamut criterion, RGB, YCbCr, xvYCC, XYZ or the like may be used. That is, the input color space type information may indicate RGB when set to 0000, indicate YCbCr when set to 0001, indicate xvYCC when set to 0010 and indicate XYZ when set to 0011. Values of the input_color_space_type information, 0100 to 1111, may be reserved for future use. The input_color_space_type information may be used along with color_gamut_type information. For example, when the input_color_space_type information indicates RGB and the color_gamut_type information indicates BT.2020 constant luminance, the information may indicate that the corresponding image is expressed in RGB based on BT.2020 CL.

Input_color_precision information indicates color expression precision and may be used in association with the input_color_space_type information as necessary. For example, in the case of RGB, the same color can be expressed with different precisions such as 10 bits, 12 bits and 14 bits. When a color needs to be expressed with a floating point, the input_color_precision information can indicate precision corresponding to digits after a decimal point.

Output_color_space_type information is opposite of the input_color_space_type information and indicates a final color gamut criterion targeted after HDR video processing. As a color gamut criterion, RGB, YCbCr, xvYCC, XYZ or the like may be used. That is, the output_color_space_type information may indicate RGB when set to 0000, indicate YCbCr when set to 0001, indicate xvYCC when set to 0010 and indicate XYZ when set to 0011. Values of the output_color_space_type information, 0100 to 1111, may be reserved for future use. Output_color_precision information indicates color expression precision and may be used in association with the output color_space_type information as necessary. Embodiments with respect to the output_color_precision information may be applied in the same manner as embodiments with respect to the input_color_precision information. Processing_color_space_type information indicates a color space in which HDR video processing is performed. While a neutral color space such as XYZ may be used in general, a specific color space may be designated and used. As a processing color space, XYZ, YCbCr (BT.2020, non-CL), YCbCr (BT.2020, CL), CIE L*a*b* and YUV may be used. That is, XYZ may be set as a color space type when the processing_color_space_type information is set to 0000, YCbCr (BT.2020, non-CL) may be set as a color space type when the processing_color_space_type information is set to 0001, YCbCr (BT.2020, CL) may be set as a color space type when the processing_color_space_type information is set to 0010, CIE L*a*b* may be set as a color space type when the processing_color_space_type information is set to 0011 and YUV may be set as a color space type when the processing_color_space_type information is set to 0100.

Processing_color_precision information indicates color expression precision and may be used in association with the processing_color_space_type in formation as necessary. Embodiments with respect to the processing_color_precision information may be applied in the same manner as embodiments with respect to the input_color_precision information.

The HDR information descriptor may further include target information. For the dynamic range information, the target information indicates information about a result which is a target when image enhancement of a corresponding frame/scene is achieved through the HDR information descriptor. Here, the target may be a video format or a targeted display.

Target information may include the following elements. Number_of_target_dynamic_range_info_type information indicates the number of target dynamic range information types. Target_dynamic_range_info_type information defines the type of dynamic range information which is a target of HDR video processing. Target_dynamic_range_info_value information indicates a specific value of information defined by the target_dynamic_range_info_type information. Target_transfer_function_type, target_color_gamut_type and target_color_temperature_type respectively indicate information about a type of a target transfer function, a type of a color gamut, and a type of a color temperature. This information may have meanings corresponding to the aforementioned number_of_dynamic_range_info_type, dynamic_range_info_type, dynamic_range_info_value, transfer_function_type, color_gamut_type and color_temperature_type. Here, previously defined values indicate a dynamic range, a color gamut and a transfer function of an image which is a target of HDR video processing.

FIG. 19 illustrates an HDR information descriptor according to an embodiment of the present invention. The shown information may be additionally included in the corresponding descriptor together with the information included in the HDR information descriptor described above with reference to FIG. 4. The HDR information descriptor may further include HDR program transition flag information, transition set number information and transition version number information. The HDR transition flag information HDR_program_transition_flag indicates a major change in the HDR information descriptor. For example, the HDR_program_transition_flag may indicate termination of current HDR program/content when set to 1. Further, the HDR_program_transition_flag may indicate a change in HDR content, a change in an applied HDR information type, and the like when set to 1. A broadcast transmission device may indicate that the HDR information descriptor and HDR content/program have changed by setting the HDR_program_transition_flag to 1 for predetermined frames/time after generation of the changes. Otherwise, the broadcast transmission device may indicate that the HDR information descriptor and HDR content/program will change after predetermined frames/time by setting the HDR_program_transition_flag to 1 for the predetermined frames/time before generation of the changes. When this flag is signaled, a condition that a corresponding SEI message must be referred to in order to apply major change may be appended. Such signaling may be performed at a system level or a service level as well as a video level as necessary. Transition_set_number information and transition_version_number information may be transmitted as additional information for signaling properties of changed HDR content/programs. For example, it is possible to signal an HDR system used for HDR content/programs which have changed or will change or to signal set_number information related to a current target when information about a plurality of HDR targets is present, through the transition_set_number information. In addition to the transition_set_number information, the transition_version_number information may be provided as information about the next HDR content/program. Links with respect to various types of information may be provided as necessary. For example, set_number information and version_number information corresponding to 1000 nit/500 nit/100 nit target displays may be provided.

In regard to the HDR transition flag information, the transition_flag information described above with reference to FIG. 4 may be used in the following manner. The meaning of the transition_flag information may be extended to indicate a major change in the HDR information descriptor. That is, the transition_flag information may be used in such a manner that the transition_flag information indicates termination of an HDR information descriptor corresponding to the current program when set to 1 and thus represents that SDR starts, another HDR program starts or another type of metadata is applied. A specific meaning and method of signaling may conform to HDR_program_transition_flag. Here, the transition_flag information may be used alone or may be used in association with HDR_program_transition_flag information. For example, the transition_flag information may be signaled at the end time of the corresponding HDR information descriptor (HDR content end time) and the HDR_program_transition_flag information may be signaled at the start time of the next HDR content.

In regard to the HDR transition flag information, the meaning of the set_number information described above with reference to FIG. 4 may be extended and used. The meaning of the set_number information may be extended to indicate a major change in the HDR information descriptor. That is, different set numbers may be designated to the HDR information descriptor according to program/content/channel. In this case, the set_number information can indicate that the HDR information descriptor has changed, HDR content is terminated and new HDR content is started. Further, the set_number information may be set such that it has a fixed value for a specific HDR information descriptor. For example, when different parameters can be delivered depending on HDR systems, the HDR systems may be discriminated using the set_number information.

In regard to the HDR transition flag information, the meaning of the version_number information described above with reference to FIG. 4 may be extended and used. The meaning of the version_number information may be extended to indicate a major change in the HDR information descriptor. That is, a broadcast transmission device may assign a changed version number when the HDR information descriptor changes such that a broadcast reception device mandatorily refers to the new HDR information descriptor from a frame to which the changed HDR information descriptor is applied. The version_number information may be used in a case in which a program/content changes within a channel, that is, current HDR content changes to another type of HDR content, as well as a case in which a frame/scene changes within a program. Here, the broadcast transmission device may assign and signal a specific version number to indicate a major change such as program/content change.

Figure 20:
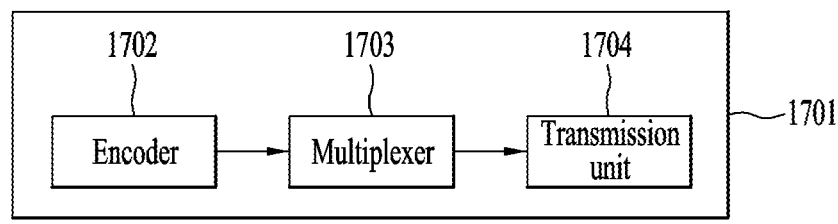
FIG. 20 is a block diagram of a broadcast transmitter according to an embodiment of the present invention.

FIG. 20 is a block diagram of a broadcast transmitter according to an embodiment of the present invention. A broadcast transmitter 1701 according to the present invention may include an encoder 1702, a multiplexer 1703 and/or a transmission unit 1704.

The resolution of video data input to the broadcast transmitter 1704 may be UHD. Metadata input to the broadcast transmitter 1701 may include video quality enhancement metadata with respect to UHD video. The video quality enhancement metadata may be included and transmitted in an SEI message transmitted along with video data. As described above with reference to FIGS. 4 to 7, the video quality enhancement metadata may include HDR_info_descriptor which includes information necessary for UHD video quality enhancement. The information necessary for UHD video quality enhancement may be applied to the entire content (channel, program and content) or applied on a scene-by-scene, clip-by-clip or frame-by-frame basis and may include common HDR metadata applied to the entire content and scene/frame HDR metadata applied on a scene-by-scene, clip-by-clip or frame-by-frame basis. Further, HDR_info_descriptor( ) may include transition_flag information indicating HDR end time.

The HDR information descriptor may include processing color space type information and processing color precision information about a video quality enhancement processing step, as described above. In addition, the HDR information descriptor may further include input color space type information and input color precision information applied before the processing step and output color space type information and output color precision information applied after the processing step. Furthermore, the HDR information descriptor may also include information about a dynamic range, a transfer function type, a color gamut and a color temperature type which are targeted by video quality enhancement processing. Further, the HDR information descriptor may include HDR program transition flag information indicating that transition of HDR content or HDR information is scheduled and set number information and version number information about the transition.

The video data input to the broadcast transmitter 1701 may be encoded by the encoder 1702. A transmission end may use HEVC (High Efficiency Video Coding) as a video data encoding scheme. The transmission end may synchronize the encoded video data with the video quality enhancement metadata and multiplex the synchronized data using the multiplexer 1703. The video quality enhancement metadata may further include synchronization information. The video quality enhancement metadata may include synchronization information such as time, a time difference, start order, a POC, a PTS and the number of accumulated frames according to synchronization methods.

The transmission unit 1704 may transmit a transport stream output from the multiplexer 1703 as a broadcast signal. Here, the transport stream may be channel-coded and modulated and then transmitted as a broadcast signal. According to another embodiment of the present invention, the metadata may be transmitted through other paths (e.g., IP based broadcast/communication, wired/wireless communication, wired/wireless interfaces and short-range wireless communication) as well as the broadcast signal. Further, the metadata may be transmitted through a different path from a path through which video data is transmitted.

Figure 21:
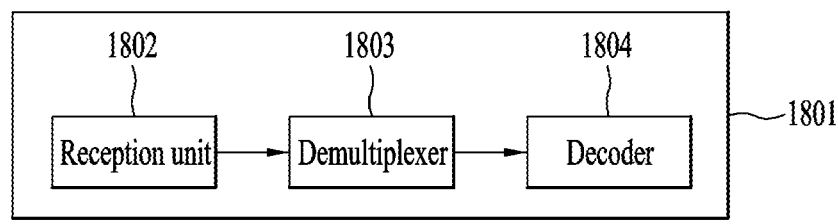
FIG. 21 is a block diagram of a broadcast receiver according to an embodiment of the present invention.

FIG. 21 is a block diagram of a broadcast receiver according to an embodiment of the present invention. A broadcast receiver 1801 according to the present invention may include a reception unit 1802, a demultiplexer 1803 and/or a decoder 1804.

A broadcast signal received by the reception unit 1802 may be demodulated and then channel-decoded. The channel-decoded broadcast signal may be input to the demultiplexer 1803 to be demultiplexed into a video stream and video quality enhancement metadata. The metadata may be received through other paths (e.g., IP based broadcast/communication, wired/wireless communication, wired/wireless interfaces and short-range wireless communication) as well as the broadcast signal. The output of the demultiplexer may be input to the decoder 1804. The decoder may include a video decoder and a metadata processor. That is, the video stream can be decoded by the video decoder and the video quality enhancement metadata can be decoded by the metadata processor. The decoded video stream and video quality enhancement metadata may be used for UHD video quality enhancement by the post processor, as described with reference to FIG. 19. The receiver can post-process the decoded video signal on the basis of the video quality enhancement metadata and enhance video quality of the video data for at least one of HDR and WCG. The video quality enhancement metadata may include the HDR information descriptor as described above, and the HDR information descriptor may include processing color space type information and processing color precision information about a video quality enhancement processing step, as described above. In addition, the HDR information descriptor may further include input color space type information and input color precision information applied before the processing step and output color space type information and output color precision information applied after the processing step. Furthermore, the HDR information descriptor may also include information about a dynamic range, a transfer function type, a color gamut and a color temperature type which are targeted by video quality enhancement processing. Further, the HDR information descriptor may include HDR program transition flag information indicating that transition of HDR content or HDR information is scheduled and set number information and version number information about the transition.

Figure 22:
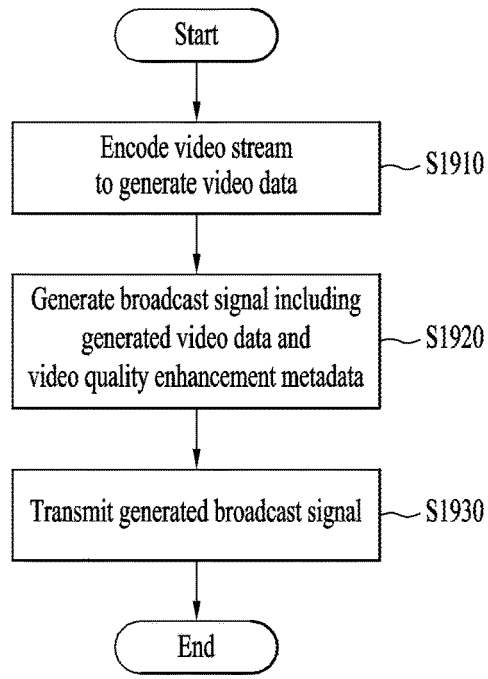
FIG. 22 is a flowchart illustrating a method of transmitting a broadcast signal including video quality enhancement metadata according to an embodiment of the present invention.

FIG. 22 illustrates a method of transmitting a broadcast signal including video quality enhancement metadata according to an embodiment of the present invention. The method of transmitting a broadcast signal including video quality enhancement metadata may include a step S1910 of encoding a video stream to generate video data, a step S1920 of generating a broadcast signal including the generated video data and video quality enhancement metadata, and a step S1930 of transmitting the generated broadcast signal.

In step S1910 of encoding a video stream to generate video data, a UHD video stream may be received and encoded to generate video data. Here, the video stream may be encoded using HEVC (High Efficiency Video Coding). In step S1910 of generating video data, the video quality enhancement metadata may be generated. As described above, the broadcast transmission device can generate the video quality enhancement metadata which is applied to entire content (channel, program and content), a scene, a clip or a frame of the video data in step S1910 of generating the video data. The video quality enhancement metadata may be data with respect to at least one of HDR and WCG and may have different quantities of information depending on application units. The video quality enhancement metadata may be included in the HDR_info_descriptor( ) and transmitted. Further, HDR_info_descriptor( ) can include transition_flag indicating HDR end time. The HDR information descriptor may include processing color space type information and processing color precision information about a video quality enhancement processing step, as described above. In addition, the HDR information descriptor may further include input color space type information and input color precision information applied before the processing step and output color space type information and output color precision information applied after the processing step. Furthermore, the HDR information descriptor may also include information about a dynamic range, a transfer function type, a color gamut and a color temperature type which are targeted by video quality enhancement processing. Further, the HDR information descriptor may include HDR program transition flag information indicating that transition of HDR content or HDR information is scheduled and set number information and version number information about the transition. In addition, the video quality enhancement metadata may be directly defined in signaling information or generated by referring to another message. Such video quality enhancement metadata may be reference data used for the receiver to enhance video quality of video data according to application unit. Consequently, the receiver can dynamically enhance video quality of video data using the video quality enhancement metadata received along with the video data.

In step S1920 of generating a broadcast signal including the generated video data and video quality enhancement metadata, a broadcast signal frame may be constructed and modulated to generate a broadcast signal.

In step S1930 of transmitting the generated broadcast signal, a transport stream may be transmitted as the broadcast signal.

Figure 23:
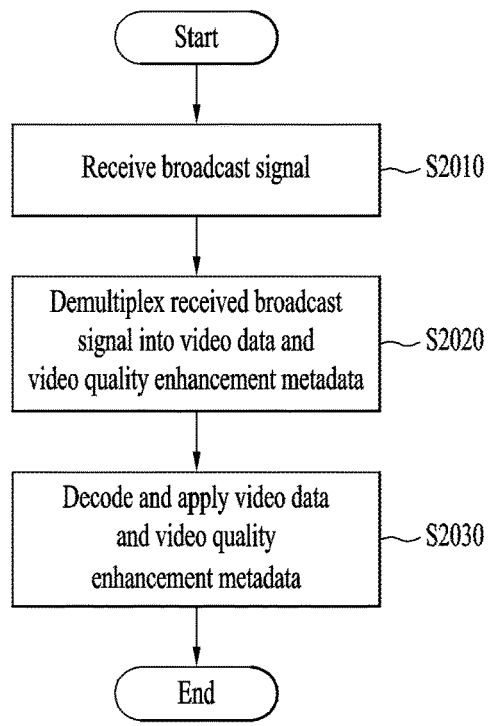
FIG. 23 is a flowchart illustrating a method of receiving a broadcast signal including video quality enhancement metadata according to an embodiment of the present invention.

FIG. 23 illustrates a method of receiving a broadcast signal including video quality enhancement metadata according to an embodiment of the present invention. The method of receiving a broadcast signal including video quality enhancement metadata may include a step S2010 of receiving a broadcast signal, a step S2020 of demultiplexing the received broadcast signal into video data and video quality enhancement metadata and a step S2030 of decoding and applying the video data and the video quality enhancement metadata.

In step S2010 of receiving a broadcast signal, the broadcast signal may be received using a reception unit, demodulated and then channel-decoded. The broadcast signal may include a UHD broadcast signal and may further include video quality enhancement metadata with respect to UHD broadcast content. The video quality enhancement metadata has been described in detail with reference to FIGS. 4 to 15.

In step S2020 of demultiplexing the received broadcast signal into the video data and the video quality enhancement metadata, the channel-decoded broadcast signal may be demultiplexed into the video data and the video quality enhancement metadata using a demultiplexer. The video data may include UHD video data and the video quality enhancement metadata may include HDR or WCG related data applied to the UHD video data. The video quality enhancement metadata may be included in the HDR_info_descriptor( ) and received. Further, the HDR_info_descriptor( ) can include transition_flag indicating HDR end time. Here, the video quality enhancement metadata may be divided into common HDR metadata and scene/frame HDR metadata according to application range thereof. The video quality enhancement metadata may include at least one of the common HDR metadata and the scene/frame HDR metadata. The common HDR metadata may be information applied to all channels, all programs or all video data constituting one piece of content and the scene/frame HDR metadata may be data applied to some scenes, clips or frames of the video data. The video quality enhancement metadata may be directly defined in signaling information of the broadcast signal or a previously defined message may be referred to.

In step S2030 of decoding and applying the video data and the video quality enhancement metadata, the video data may be decoded using a video decoder to acquire the video data. In this step, the video quality enhancement metadata can be acquired using a signaling data parser or a metadata decoder. The receiver can enhance video quality of the decoded video data on the basis of the video quality enhancement metadata. The video quality enhancement metadata may include HDR or WCG information regarding the video data and may further include synchronization information indicating an information application time. The video quality enhancement metadata may include the HDR information descriptor as described above, and the HDR information descriptor may include processing color space type information and processing color precision information about a video quality enhancement processing step, as described above. In addition, the HDR information descriptor may further include input color space type information and input color precision information applied before the processing step and output color space type information and output color precision information applied after the processing step. Furthermore, the HDR information descriptor may also include information about a dynamic range, a transfer function type, a color gamut and a color temperature type which are targeted by video quality enhancement processing. Further, the HDR information descriptor may include HDR program transition flag information indicating that transition of HDR content or HDR information is scheduled and set number information and version number information about the transition.

The video quality enhancement metadata may be applied to the video data on the basis of the synchronization information. Accordingly, video quality enhancement can be applied to all video data or applied per section. A user can be provided with UHD content with enhanced video quality through HDR or WCG information additionally applied to previous UHD content.

Although the description of the present invention is explained with reference to each of the accompanying drawings for clarity, it is possible to design new embodiments by merging the embodiments shown in the accompanying drawings with each other. Additionally, if a recording medium readable by a computer, in which programs for executing the embodiments mentioned in the foregoing description are recorded, is designed by those skilled in the art, this is within the scope of the appended claims and their equivalents.

An apparatus and method according to the present invention may be non-limited by the configurations and methods of the embodiments mentioned in the foregoing description. In addition, the embodiments mentioned in the foregoing description may be configured in a manner of being selectively combined with one another entirely or in part to enable various modifications.

In addition, a method according to the present invention may be implemented with processor-readable code in a processor-readable recording medium provided to a network device. The processor-readable medium may include all kinds of recording devices capable of storing data readable by a processor. The processor-readable medium may include one of ROM, RAM, CD-ROM, magnetic tapes, floppy disks, optical data storage devices, and the like for example and also include a carrier-wave type implementation such as a transmission via Internet. Furthermore, as the processor-readable recording medium is distributed to a computer system connected via network, processor-readable code may be saved and executed according to a distributed system.

It will be appreciated by those skilled in the art that various modifications and variations may be made in the present invention without departing from the spirit or scope of the inventions. Thus, it is intended that the present invention cover the modifications and variations of this invention provided they come within the scope of the appended claims and their equivalents.

Both the product invention and the process invention are described in the specification and the description of both inventions may be supplementarily applied as needed.

MODE FOR INVENTION

Various embodiments have been described in the best mode for carrying out the invention.

INDUSTRIAL APPLICABILITY

The present invention can be used for broadcast and video signal processing and is reproducible and industrially applicable.

What is claimed is:

1. A method of receiving a broadcast signal, the method comprising:
    receiving the broadcast signal including video data and video quality enhancement metadata, wherein the video quality enhancement metadata includes high dynamic range (HDR) information or wide color gamut (WCG) information, further the video quality enhancement metadata includes information indicating a change in the HDR information;
    demultiplexing the broadcast signal into the video data and the video quality enhancement metadata;
    detecting the change in the HDR information based on the information indicating the change in the HDR information included in the video quality enhancement metadata in advance before parsing all HDR metadata;
    parsing specific HDR metadata only when detecting the change in the HDR information; and
    processing video data for HDR based on the parsed specific HDR metadata.

2. The method according to claim 1, wherein the WCG information includes input color space type information applied before video quality enhancement processing, processing color space type information applied to the video quality enhancement processing, and output color space type information applied after the video quality enhancement processing.

3. The method according to claim 2, wherein the HDR information includes HDR information applied to video quality enhancement processing and HDR information about video quality which is targeted after the video quality enhancement processing.

4. The method according to claim 2, wherein the video quality enhancement metadata further includes set number information and version number information related to the changed HDR information.

5. A broadcast signal reception device comprising:
    a receiver configured to receive a broadcast signal including video data and video quality enhancement metadata, wherein the video quality enhancement metadata includes high dynamic range (HDR) information or wide color gamut (WCG) information, further the video quality enhancement metadata includes information indicating a change in the HDR information;
    a demultiplexer configured to demultiplex the broadcast signal into the video data and the video quality enhancement metadata; and
    a processor configured to:
        detect the change in the HDR information based on the information indicating the change in the HDR information included in the video quality enhancement metadata in advance before parsing all HDR metadata,
        parse specific HDR metadata only when detecting the change in the HDR information, and
        process video data for HDR based on the parsed specific HDR metadata.

* * * * *